US011238593B2

(12) United States Patent
Turgutlu et al.

(10) Patent No.: US 11,238,593 B2
(45) Date of Patent: Feb. 1, 2022

(54) MULTI-OBJECT IMAGE PARSING USING NEURAL NETWORK PIPELINE

(71) Applicant: Adobe Inc., San Jose, CA (US)

(72) Inventors: Kerem Can Turgutlu, San Jose, CA (US); Jayant Kumar, San Jose, CA (US); Jianming Zhang, Campbell, CA (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 21 days.

(21) Appl. No.: 16/789,088

(22) Filed: Feb. 12, 2020

(65) Prior Publication Data
US 2021/0248748 A1   Aug. 12, 2021

(51) Int. Cl.
*G06T 7/00* (2017.01)
*G06T 7/11* (2017.01)
*G06T 3/40* (2006.01)
*G06T 7/194* (2017.01)
*G06N 3/04* (2006.01)

(52) U.S. Cl.
CPC ............ *G06T 7/11* (2017.01); *G06N 3/04* (2013.01); *G06T 3/4046* (2013.01); *G06T 7/194* (2017.01); *G06T 2207/20021* (2013.01); *G06T 2207/20081* (2013.01); *G06T 2207/20084* (2013.01); *G06T 2207/20112* (2013.01); *G06T 2207/30196* (2013.01)

(58) Field of Classification Search
CPC ......... G06T 7/11; G06T 3/4046; G06T 7/194; G06T 2207/20084; G06T 2207/20112; G06T 2207/30196; G06T 2207/20081; G06T 2207/20021; G06N 3/04
See application file for complete search history.

(56) References Cited

U.S. PATENT DOCUMENTS

| 2017/0236290 A1* | 8/2017 | Sorkine Hornung ..... G06T 7/11 382/173 |
| 2021/0133518 A1* | 5/2021 | Yao ...................... G06K 9/6857 |

OTHER PUBLICATIONS

Jian Zhao et al., "Understanding Humans in Crowded Scene: Deep Nested Adversarial Learning and A New Benchmark for Multi-Human Parsing", arXiv:1812.00181v1, Dec. 2, 2018, 11 pages (Year: 2018).*

(Continued)

*Primary Examiner* — Ping Y Hsieh
(74) *Attorney, Agent, or Firm* — Finch & Maloney PLLC

(57) ABSTRACT

Techniques are disclosed for parsing a source image, to identify segments of one or more objects within the source image. The parsing is carried out by an image parsing pipeline that includes three distinct stages comprising three respectively neural network models. The source image can include one or more objects. A first neural network model of the pipeline identifies a section of the source image that includes the object comprising a plurality of segments. A second neural network model of the pipeline generates, from the section of the source image, a mask image, where the mask image identifies one or more segments of the object. A third neural network model of the pipeline further refines the identification of the segments in the mask image, to generate a parsed image. The parsed image identifies the segments of the object, by assigning corresponding unique labels to pixels of different segments of the object.

20 Claims, 14 Drawing Sheets
(8 of 14 Drawing Sheet(s) Filed in Color)

(56) References Cited

OTHER PUBLICATIONS

Zhao, F.J. et al., "The Multi-Human Parsing", Mar. 27, 2018, retrieved from the Internet https://lv-mhp.github.io/, 3 pages.
Lin, L. et al., "The Look Into Person", Dec. 1, 2016, retrieved from the Internet http://sysu-hcp.net/lip/mparsing_challenge.php, 2 pages.
Brabandere, B. D. et al., "Semantic Instance Segmentation with a Discriminative Loss Function", arXiv:1708.02551v1, Aug. 8, 2017, 10 pages.
Li, J. et al., "Multi-Human Parsing in the Wild", arXiv:1705.07206v2, Mar. 15, 2018, 19 pages.
He, K. et al., "Mask R-CNN", arXiv:1703.06870v3, Jan. 24, 2018, 12 pages.
Zhao, J. et al., "Understanding Humans in Crowded Scenes: Deep Nested Adversarial Learning and A New Benchmark for Multi-Human Parsing", arXiv:1804.03287v3, Jul. 6, 2018, 14 pages.
Qiao, S. et al., "Neural Rejuvenation: Improving Deep Network Training by Enhancing Computational Resource Utilization", arXiv:1812.00481v1, Dec. 2, 2018, 11 pages.
U.S. Appl. No. 16/388,115, filed Apr. 18, 2019, 40 pages.
Jiang, H. and K. Grauman, "Detangling People: Individuating Multiple Close People and Their Body Parts via Region Assembly" Computer Vision Foundation, arXiv: 1604.03880v1, Apr. 13, 2016, 20 pages.
Li, Q., et al., "Holistic, Instance-level Human Parsing", arXiv:1709.03612v1, Sep. 11, 2017, 22 pages.
Russakovsky, O. et al., "ImageNet Large Scale Visual Recognition Challenge", arXiv:1409.0575v3, Jan. 30, 2015, 43 pages.
Lin, T.Y. et al., "Microsoft coco: Common objects in context", arXiv:1405.0312v3, Feb. 21, 2015, 15 pages.

\* cited by examiner

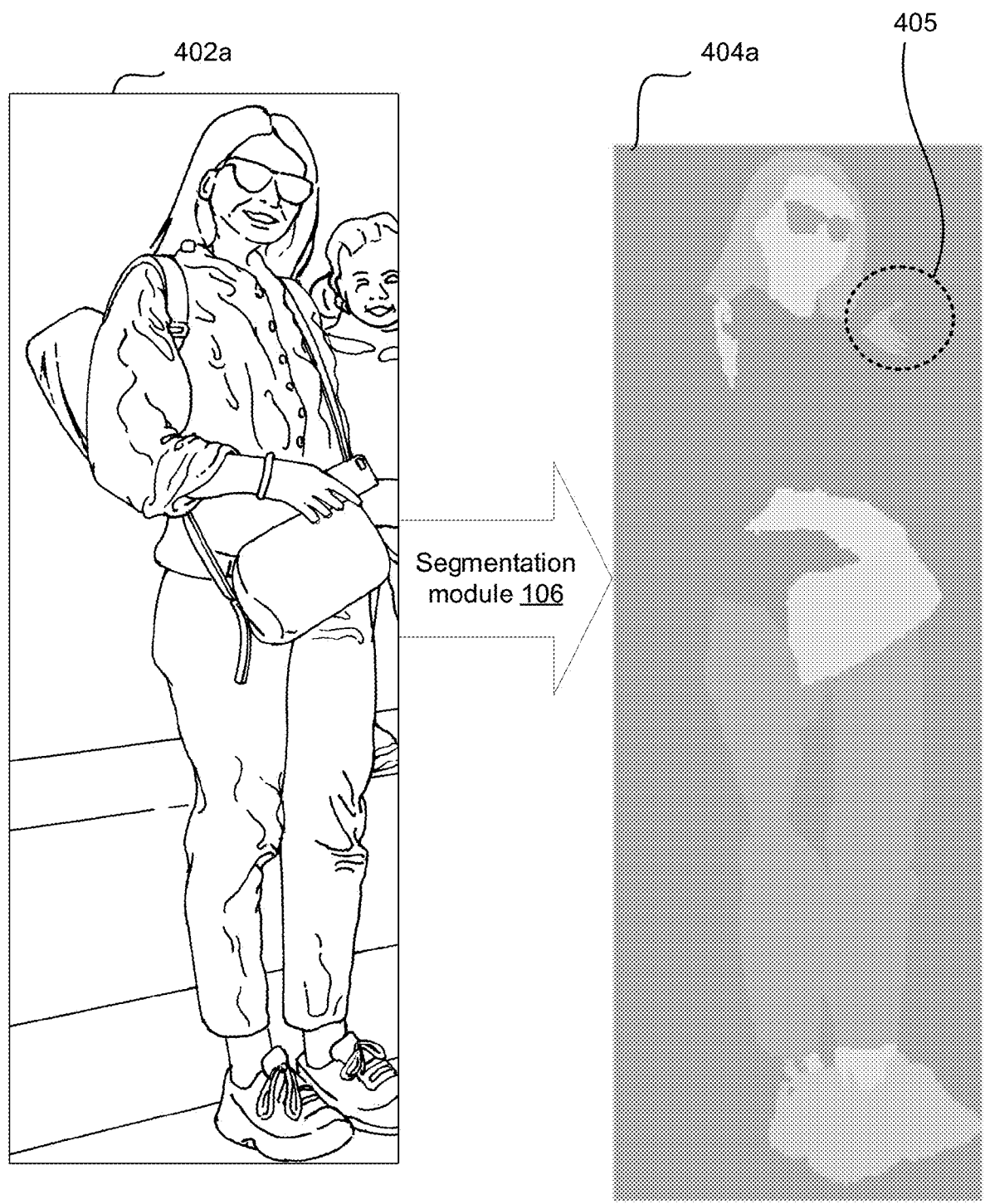
FIG. 4B1

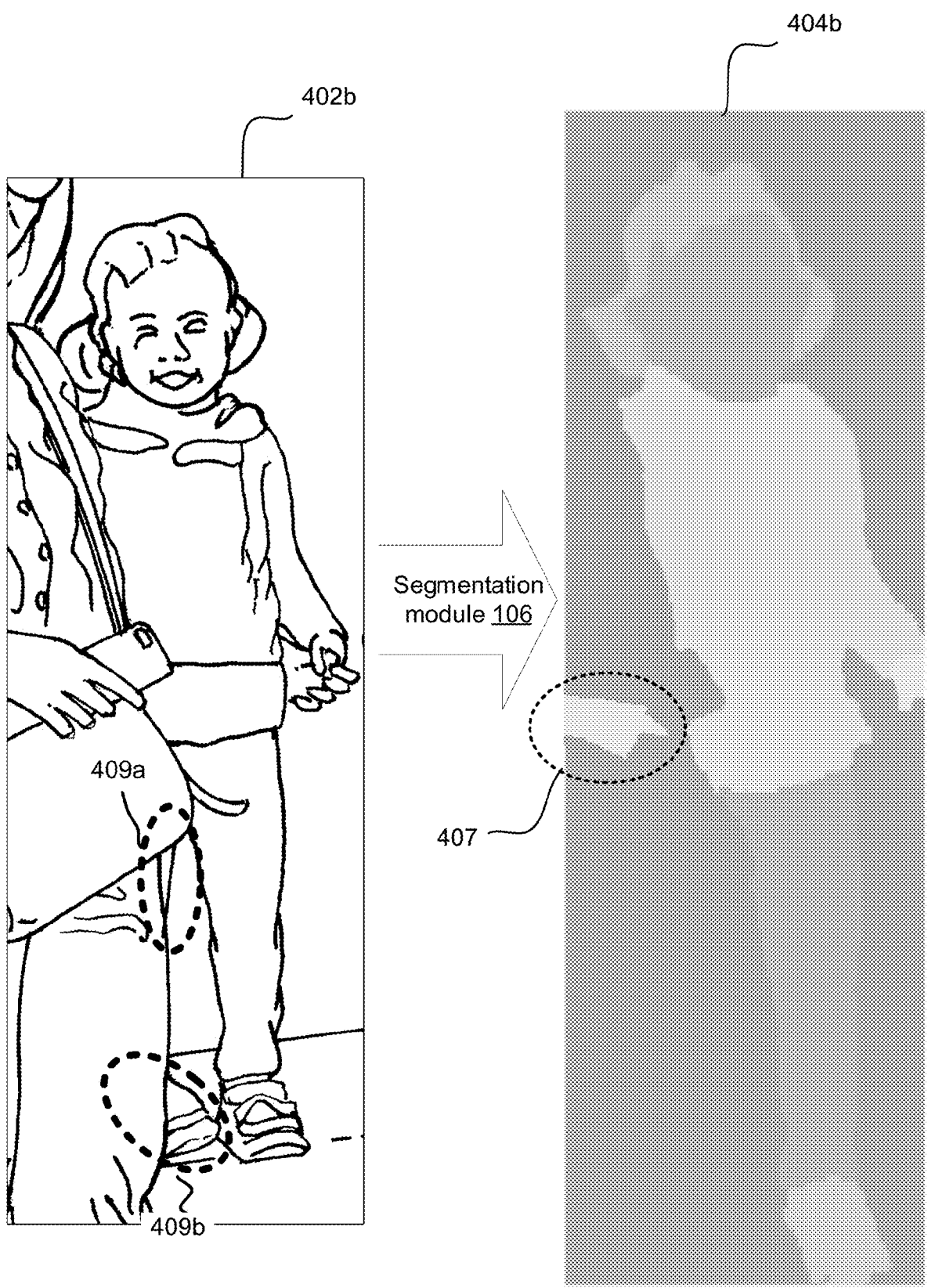
FIG. 4B2

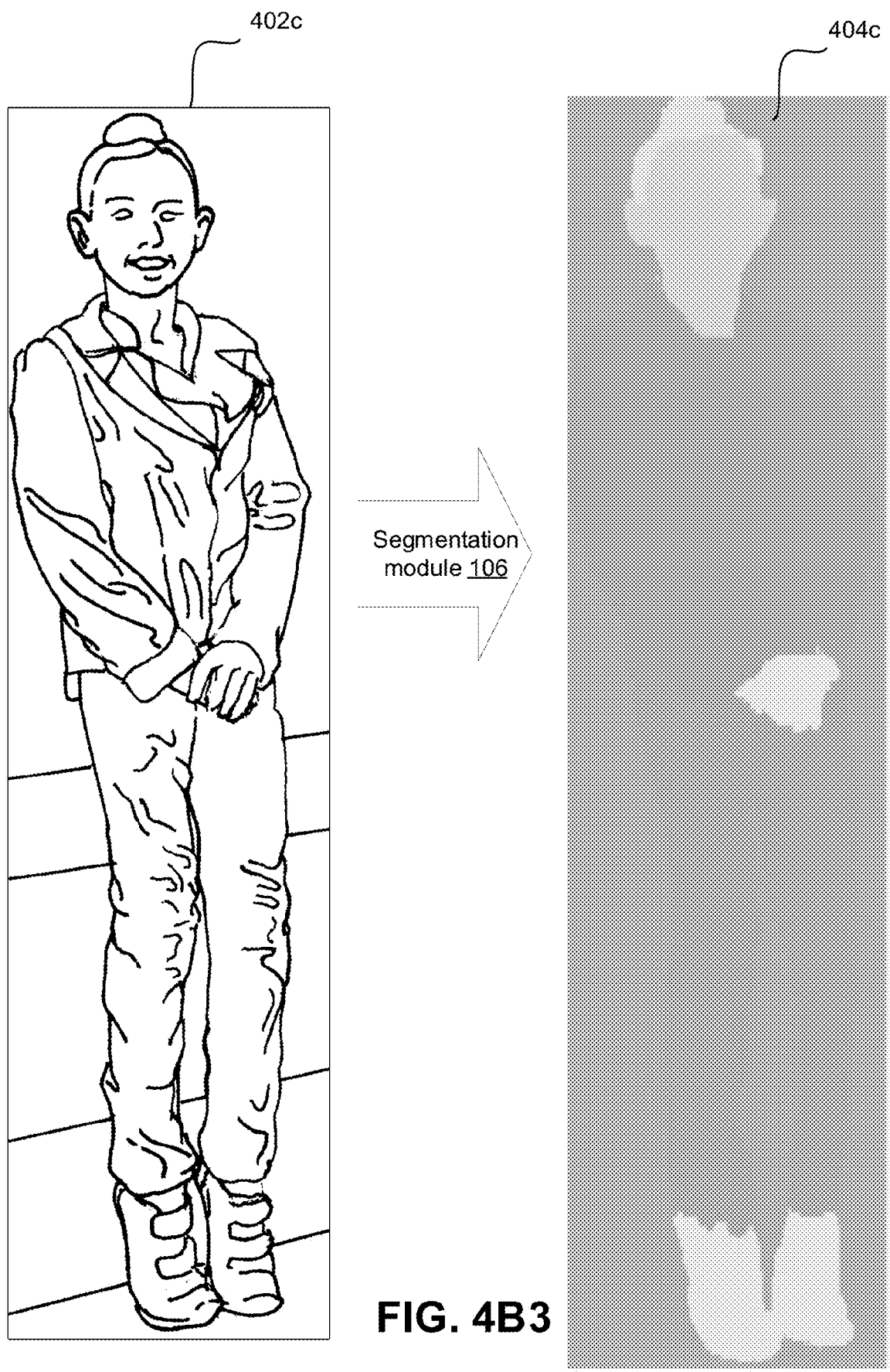
FIG. 4B3

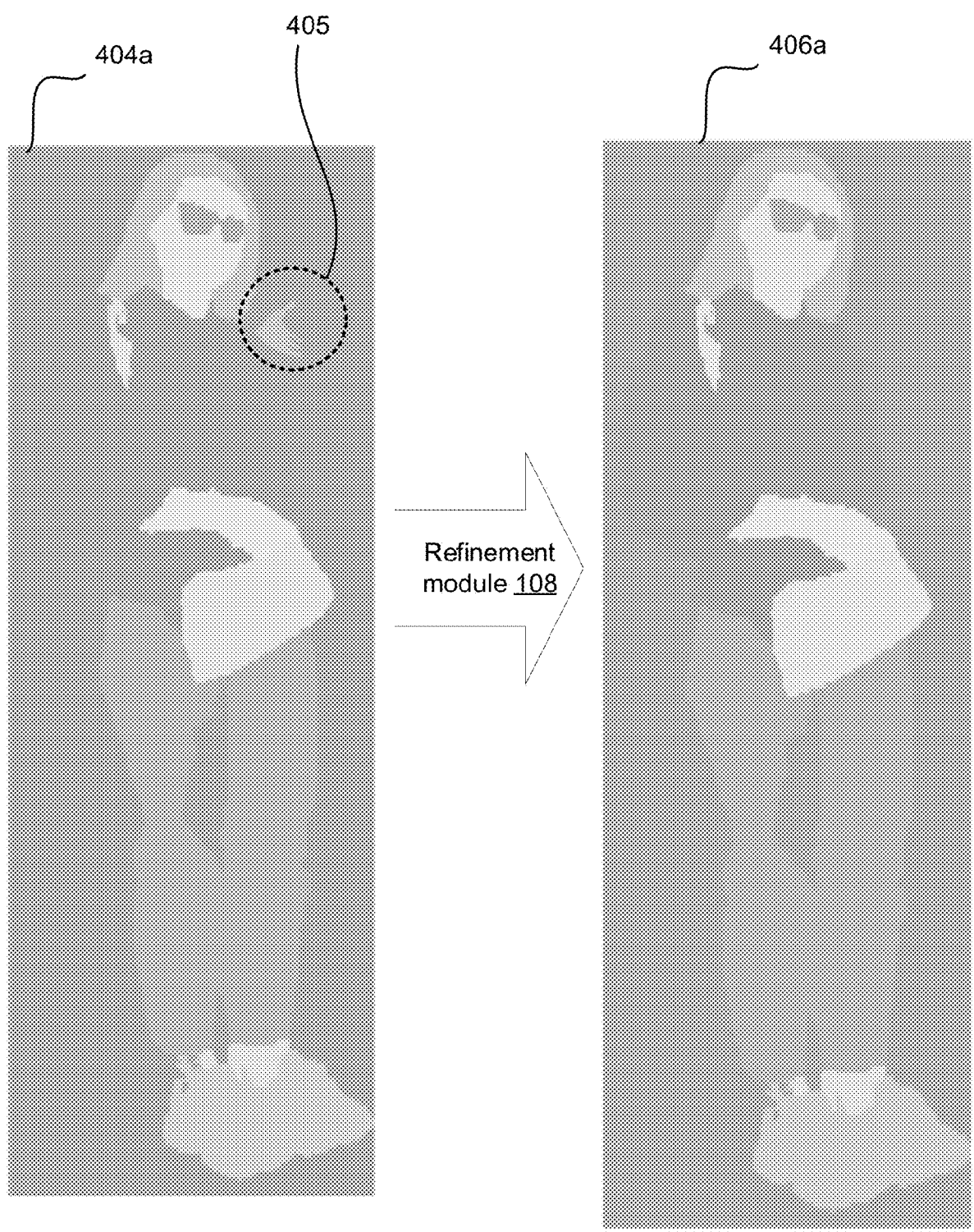
FIG. 4C1

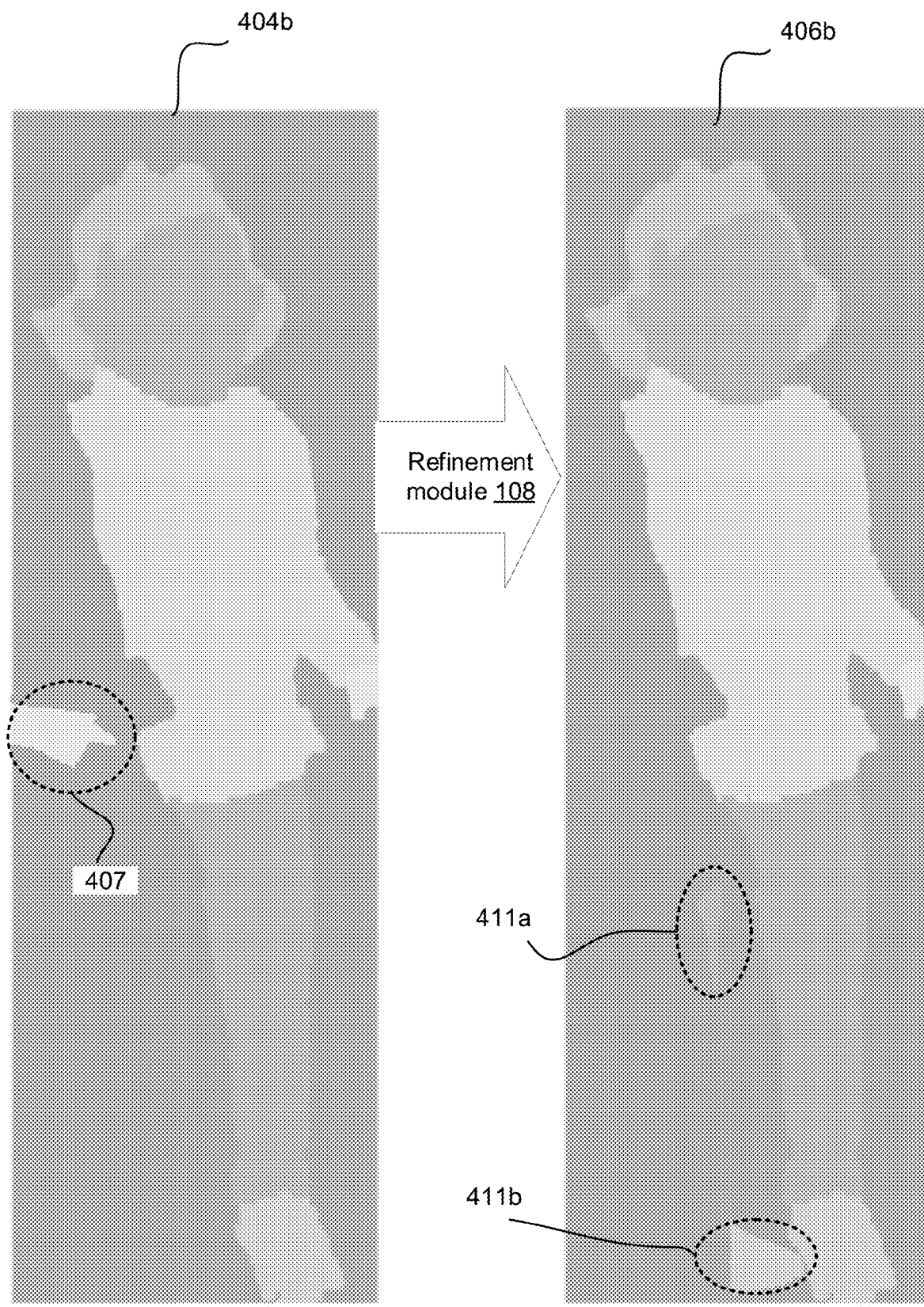
FIG. 4C2

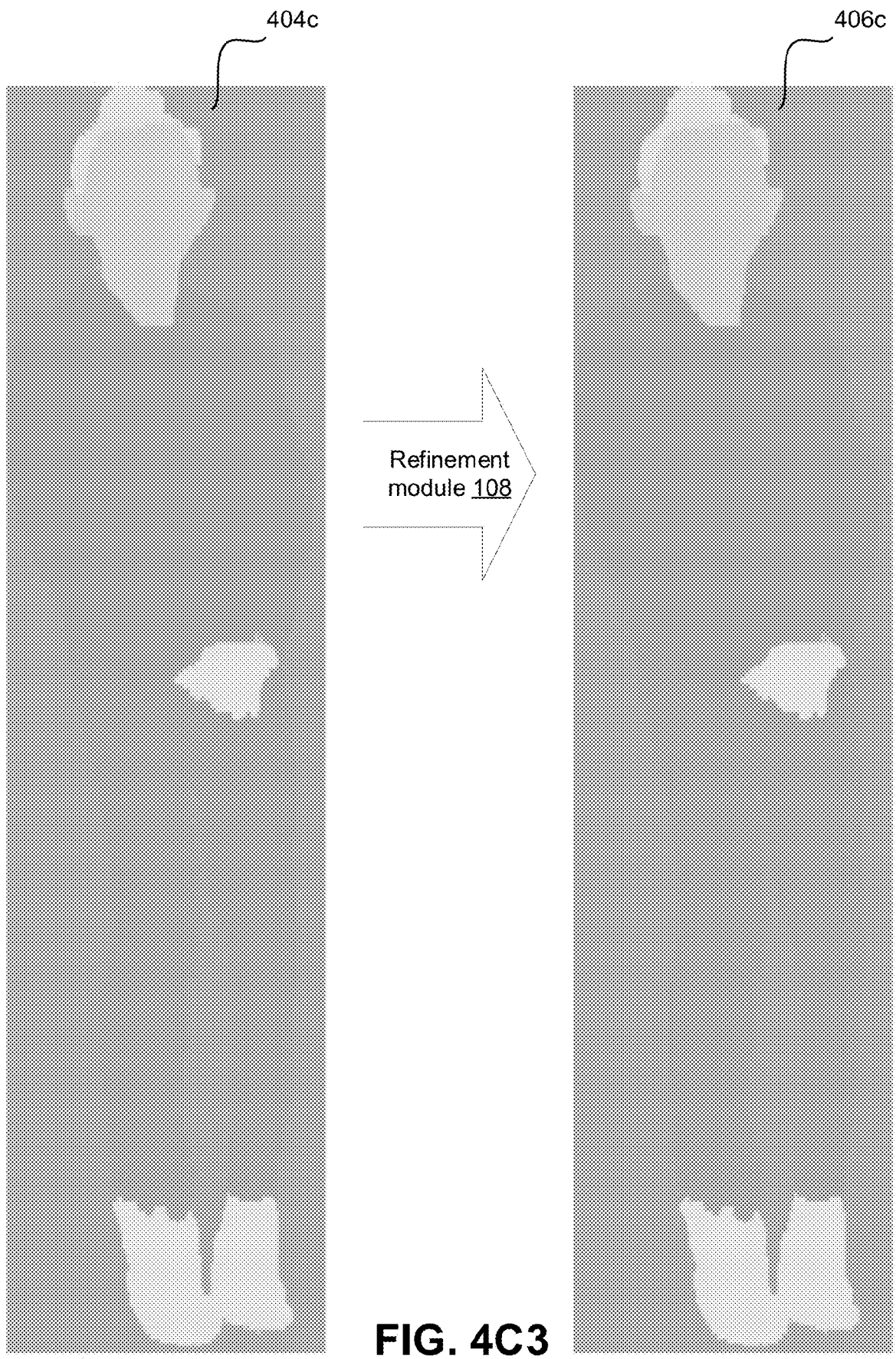
FIG. 4C3

MULTI-OBJECT IMAGE PARSING USING NEURAL NETWORK PIPELINE

FIELD OF THE DISCLOSURE

This disclosure relates generally to image processing, and more specifically to techniques for parsing multi-object images using a neural network pipeline.

BACKGROUND

In recent years, convolutional neural networks (CNNs) have been widely applied to various tasks such as image classification, object detection, and instance segmentation. Multi-human body parsing (MHP) however is a relatively new task, first introduced in 2018. Multi-human body parsing refers to semantically identifying body parts of each individual in a given image, whereas previous simpler tasks dealt with one person per image. An MHP task not only requires identifying multiple individuals in an image but also accurate segmentation of predefined body parts. The original MHP V1.0 dataset uses the following labels: background, hat, hair, sunglasses, upper-clothes, skirt, pants, dress, belt, left-shoe, right-shoe, face, left-leg, right-leg, left-arm, right-arm, bag, scarf, and torso-skin. Multi-human body parsing can be considered a subtask of instance segmentation. The current state-of-the-art for the MHP benchmark, Nested Adversarial Networks (NAN), consists of Generative Adversarial Network (GAN)-like sub-nets. These networks jointly perform saliency segmentation for foreground, instance-agnostic segmentation for body parts, and instance-aware segmentation for instances (humans). Mask R-CNN is a technique used in object instance segmentation that extends Faster R-CNN by adding a segmentation head to it. Another MHP technique uses a Graph-GAN model. Other techniques include a discriminative loss function that transforms an image into a representation and later clusters it into individual instances. There are a number of non-trivial issues associated with each of these techniques. For example, occlusion of one person or their body parts by another person in the image makes the problem more challenging. These techniques result in relatively low accuracy of human body part segmentation, and/or relatively high complexity, which in turn leads to poor model explainability and thus difficulty in improving the model.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A, 4B1, 4B2, 4B3, 4C1, 4C2, and 4C3 illustrate various example images discussed with respect to the method of FIG. 3, in accordance with some embodiments of the present disclosure.

DETAILED DESCRIPTION

Figure 1:
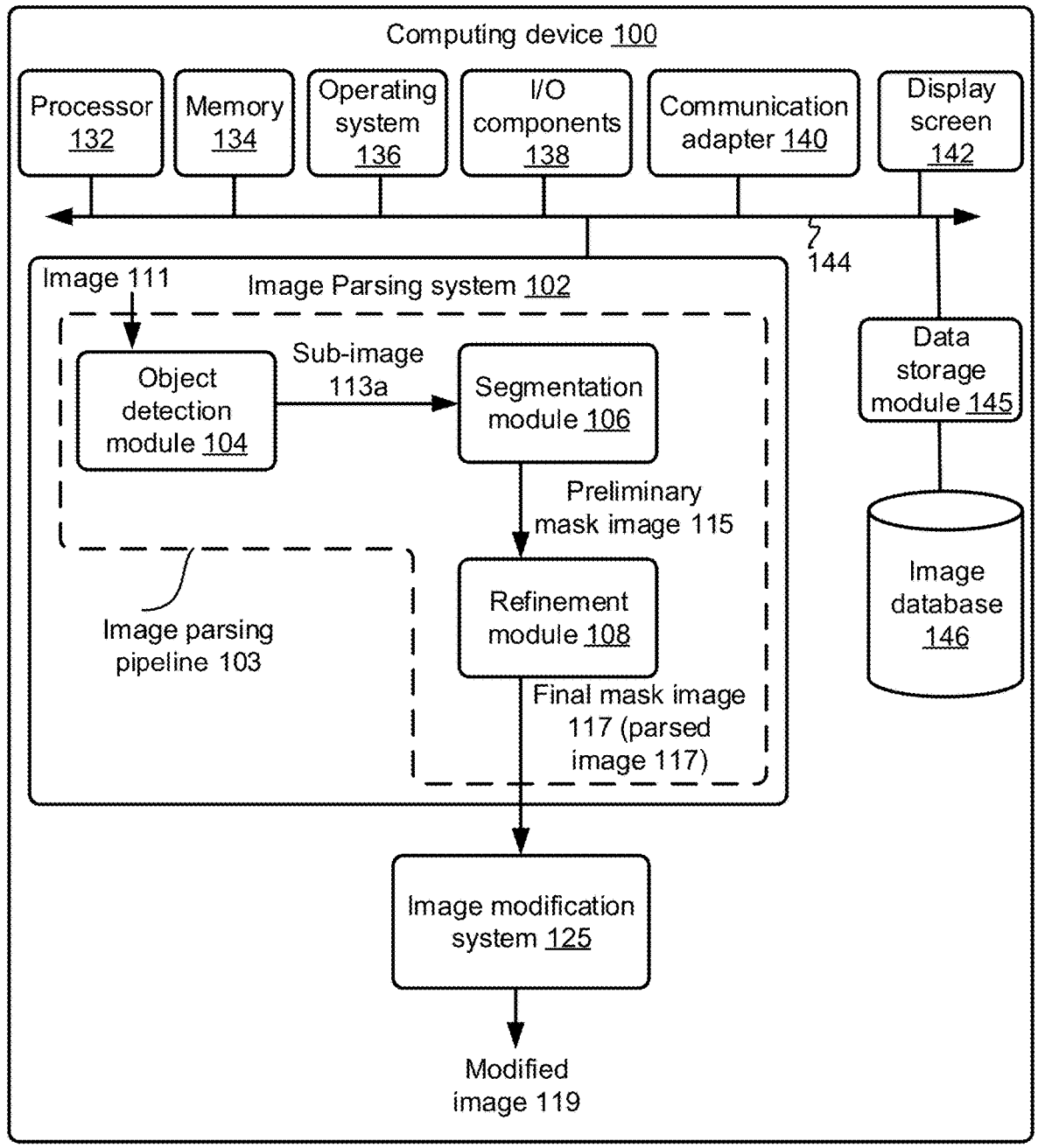
FIG. 1 is a block diagram schematically illustrating selected components of an example computing device configured to parse an image and optionally modify the parsed image, in accordance with some embodiments of the present disclosure.

Techniques are disclosed for parsing an image, by identifying various segments of various objects within the image. The techniques are particularly useful in parsing images that include one or more people, but can be used to detect other objects as well. Once the segments are accurately parsed and identified, a specific segment of the image can be modified, based on an identification of pixels within the segment. So, for instance, if the object is a human, the identified segments might include hair, shirt, and pants, and the user can change the color of any of those segments.

In an embodiment, a system embodying the techniques includes three neural networks: an object detection model, a semantic segmentation model, and a mask refinement model. These models sequentially detect individual people (or other objects of interest) in a given input image, segment predefined body parts of each individual, and then refine these segmentation results for further improvement of the final parsed image. In some such embodiments, the image parsing is performed by an image parsing pipeline comprising three distinct stages, with each stage dedicated to one of the three models. For example, a first stage of the pipeline comprises the object detection module that is configured to identify individual objects, such as persons, within a source image. A second stage of the pipeline comprises the segmentation module, which performs semantic segmentation of each section of the source image within a corresponding bounding box, and generates a corresponding preliminary mask image. Each preliminary mask image includes segmentation of a corresponding object. That is, a preliminary mask image labels pixels that belong to a first segment of the object using a first label, labels pixels that belong to a second segment of the object using a second label, and so on. In some such embodiments, the segmentation module is pretrained based on transfer learning techniques, using a relatively small training dataset. A third stage of the pipeline comprises the refinement module, which refines a preliminary mask image to generate a corresponding final mask image (also referred to herein as a parsed image). For example, during the refinement process, the boundaries of the segments of the preliminary mask image can be refined or fine-tuned, to generate a more accurate segmentation. The refinement is based on a comparison of the source image and the preliminary mask image. In some embodiments, once the segments are identified in the parsed image, a specific segment of the image can be modified, based on an identification of pixels within the segment.

As will be appreciated in light of this disclosure, the techniques provided herein can be used for relatively accurate human body part segmentation, and can serve as a core technology for many creative applications, such as image/video editing applications, advertisement or mock-up applications, and search applications, to name a few examples. In any such cases, the decomposed architecture using three deep learning modules or stages with different architectures allows for a relatively high degree of model explainability and more flexibility for improvement of the final mask image. As will be further appreciated, transfer learning helps to obtain much better segmentation results with a small dataset, and the multi-stage pipeline architecture enables each stage to be independently modified. For example, just switching segmentation models (e.g., from a 400 MB model to a 4 MB model) of the segmentation stage without making any changes in the detection and refinement stages enables relatively easy cloud-to-mobile deployment. In addition, experiments show that transfer learning boosts segmentation performance significantly especially when training data size is limited (e.g., 20% improvement is obtained with 4000 training samples and much more when training data size is even less). Numerous embodiments and variations will be apparent.

General Overview

As previously discussed, there are a number of non-trivial issues associated with parsing a complex image. In more detail, parsing an image involves segmenting the image into multiple segments. Segmenting an image can be challenging, especially when the image includes multiple persons. Multi-human body parsing refers to semantically identifying body parts of each individual in a given image. This task not only requires identifying individuals in an image, but also accurate segmentation of predefined body parts. Semantic segmentation (also simply referred to as segmentation) refers to a process of linking each pixel in an image to a class label. Thus, semantic segmentation of an image is a classification at a pixel level. The class labels can be, for example, human body, car, building, furniture, a body part (such as hand, legs, eyes). During segmentation, each pixel is assigned a corresponding label. For example, a pixel can be labeled as being part of a car, while another pixel can be labeled as being part of a person. Existing image parsing techniques are susceptible to relatively low accuracy segmentation, and/or relatively high complexity, which in turn leads to poor model explainability and thus difficulty in improving the model.

Thus, and in accordance with an embodiment of the present disclosure, an image parsing pipeline to parse a source image is provided. The pipeline is configured to identify various segments of individual objects included in the source image. For example, in a multi-person image, the aim of parsing is to identify various segments for each person in the image. In such a case, one segment may correspond, for example, to the person's hair, another segment to an article of clothing, and another segment to arms or legs.

Various examples and embodiments of this disclosure assume the objects to be persons, and the pipeline is discussed herein with respect to parsing persons within a source image. That is, the source image is assumed to include one or more persons, and the image parsing pipeline is a multi-human body parsing pipeline that identifies various body parts, articles of clothing and/or accessories of individual person in the image. In one such example embodiment, the class labels assigned to different pixels can include body parts of a person (such as face, hair, arm, leg, neck), clothing worn by a person (such as shirt, pant, skirt), accessories carried by a person (such as cell phone, hand bag, backpack, eyeglasses), and background components (such as sky, floor, furniture, car). However, the scope of this disclosure is not limited to parsing merely persons, and can be used to parse images comprising other types of relatively complex objects, such as buildings, trees, cars, machines, flowers, animals, and/or any other appropriate type of object that can be segmented into a number of components/features that make up the overall object.

In some embodiments, the image parsing pipeline comprises three distinct stages. For example, a first stage of the pipeline comprises an object detection module that is configured to identify individual objects, such as persons, within a source image. For example, the source image can include multiple persons, and the object detection module forms bounding boxes around individual persons. In general, a bounding box is rectangular and is defined by the corner points (or by a center point, a width, and a height), although the principles of the disclosure can be extended to non-rectangular bounding boxes as well, as discussed herein. In an example, a first bounding box is formed around a first person, a second bounding box is formed around a second person, and so on. The first bounding box does not necessarily exclusively include the first person. For example, the first bounding box can also include a portion of the second person and/or background objects (such as sky, floor, furniture). As discussed, the object detection module can be implemented using a first neural network (NN) model. In one such example embodiment, the object detection module is implemented using a faster Region Based Convolutional Neural Network (Faster-RCNN) model, although other suitable NN models will be apparent in light of this disclosure. In some embodiments, the NN model for the object detection module is trained using multiple categories of objects, such as person, man, woman, boy, girl, as well as body parts such as human face, head, eye, hair, face, beard, ear, hand, arm, leg, foot, and/or other personal belongings (e.g., bag, hat, sunglass, shoe, skirt, belt, dress, cell phone).

Continuing with the example three-stage embodiment, a second stage of the pipeline comprises a segmentation module, which performs semantic segmentation of each section of the source image within a corresponding bounding box, and generates a corresponding preliminary mask image. For example, assume that the object detection module identifies (i) a first section of the source image that includes a first person and that is defined by a first bounding box, and (ii) a second section of the source image that includes a second person and that is defined by a second bounding box. The segmentation module of the second stage of the pipeline generates (i) a first preliminary mask image corresponding to the first section of the source image, and (ii) a second preliminary mask image corresponding to the second section of the source image. The first preliminary mask image includes segmentation of the first person within the first section of the source image, and the second preliminary mask image includes segmentation of the second person within the second section of the source image. For example, in the first preliminary mask image, different body parts and/or articles of clothing of the first person are labelled using corresponding different labels. Similarly, in the second preliminary mask image, different body parts and/or articles of clothing of the second person are labelled using corresponding different labels.

In some embodiments, components of the first section of the source image, which are not part of the first person, are labelled as background in the first preliminary mask image. For example, if the first section includes portions of the second person, such portions of the second person (e.g., pixels that depict such portions of the second person) are labelled as background in the first preliminary mask image. On the other hand, merely as an example, in the first preliminary mask image, a hand of the first person is labelled using a first label, the face of the first person is labelled using a second label, legs of the first person are labelled using a third label, a shirt worn by the first person is labelled using a fourth label, and so on. Thus, each pixel in the first preliminary mask image is assigned a corresponding label, whether it be background or a specific feature attributable to the person. Similarly, in the second preliminary mask image, corresponding labels are assigned to various pixels.

In some such example embodiments, the segmentation module is pre-trained using available training dataset including images that have been segmented using human annotators. In an example, as such a training dataset is limited in the number of images that are included (e.g., as human annotator has to manually segment the objects), transfer learning technique is used for training the NN model of the segmentation module, as discussed herein. In an example case, transfer learning helps to obtain much better segmentation results with a relatively small training dataset.

In some cases, the segmentation process can be prone to errors caused by factors such as image compression noise, color similarity between masked and unmasked areas, or for any other reason. For example, a few pixels in a region may be labeled differently and erroneously, such as some strands of hair may be labeled as background, and so on. Accordingly, the segmentation performed by the segmentation module may possibly include some inaccuracies. Thus, and continuing with the example three-stage embodiment, a third stage of the pipeline comprises a refinement module, which refines a preliminary mask image to generate a corresponding final mask image. Thus, the refinement module generates (i) a first final mask image by refining the first preliminary mask image, and (ii) a second final mask image by refining the second preliminary mask image. For example, for each object, the refinement module compares the corresponding section of the source image with the corresponding preliminary mask image, and generates the corresponding final mask image based on such comparison. During the refinement process, the boundaries of the segments of the preliminary mask image can be refined or fine-tuned, to generate a more accurate segmentation. Thus, each final mask image comprises a parsed image, where various body parts, clothing, and/or accessories of various persons in the source image are segmented and labelled.

There are many applications where the parsed images can potentially be used. Merely as an example, manipulating body parts is one such application, where a user can change color, patterns or designs of clothing and/or accessories in the image, make an individual taller or shorter in the image, change a person's skin tone in the image, and/or implement another appropriate change. For example, because the parsed images identify and label pixels associated with a shirt worn by a user, the color, pattern and/or design of the shirt can now be easily changed by changing the color of the associated pixels. Another useful application is the ability to easily manipulate images for personalized ads. For example, changing the background color, dress color, and text font would enable enterprises to compare many variations of the advertisements in relatively short time period, and with relatively less effort. In another example application, parsing images to identify body parts can also power search engines to find photos with similar body part semantics. In yet another example application, for consumer products, parsing the image can facilitate a fun and easy way to manipulate and experiment with personal photos. Additional industrial applications include group behavior analysis, person re-identification, e-commerce, image editing, video surveillance, autonomous driving, and virtual reality. This could also enable body layout-based similarity search in images. For example, if a user is looking for an image that includes a person in scene with particular body pose, parsing the images will allow to compute such similarities and rank images based on that. Numerous variations and embodiments will be appreciated in light of this disclosure.

System Architecture and Example Operation

FIG. 1 is a block diagram schematically illustrating selected components of an example computing device 100 (also referred to as device 100) configured to parse an image 111 (e.g., to identify different segments associated with one or more objects within the image 111) and optionally modify the parsed image, in accordance with some embodiments of the present disclosure. As can be seen, the device 100 includes an image parsing system 102 (also referred to as system 102) that allows the device 100 to parse the image 111. In some embodiments, the device 100 optionally also includes an image modification system 125 that allows the device 100 to modify the image 111, based on the system 102 parsing the image 111. In some embodiments, the device 100 includes both the systems 102 and 125 (i.e., the device 100 performs both image parsing and modification operations); wherein in some other embodiments, the device 100 includes the system 102, but not the system 125 (i.e., the device 100 performs image parsing operations, but not image modification operations). Thus, the system 125 is optional in the device 100. As will be appreciated, the configuration of the device 100 may vary from one embodiment to the next. To this end, the discussion herein will focus more on aspects of the device 100 that are related to facilitating parsing and/or modifying an image, and less so on standard componentry and functionality typical of computing devices.

The device 100 can comprise, for example, a desktop computer, a laptop computer, a workstation, an enterprise class server computer, a handheld computer, a tablet computer, a smartphone, a set-top box, a game controller, and/or any other computing device that can process a digital image, parse the digital image, and optionally modify the digital image.

In the illustrated embodiment, the device 100 includes one or more software modules configured to implement certain functionalities disclosed herein, as well as hardware configured to enable such implementation. These hardware and software components may include, among other things, a processor 132, memory 134, an operating system 136, input/output (I/O) components 138, a communication adaptor 140, data storage module 145, and the systems 102, 125. An image database 146 (e.g., that comprises a non-transitory computer memory) stores at least one or more images that are to be parsed and/or modified, and also stores the modified image. The image database 146 is coupled to the data storage module 145. A bus and/or interconnect 144 is also provided to allow for inter- and intra-device communications using, for example, communication adaptor 140. Note that in an example, components like the operating system 136 and the systems 102, 125 can be software modules that are stored in memory 132 and executable by the processor 132. In an example, at least sections of the system 102 and/or the system 125 can be implemented at least in part by hardware, such as by Application-Specific Integrated Circuit (ASIC) or microcontroller with one or more embedded routines. The bus and/or interconnect 144 is symbolic of all standard and proprietary technologies that allow interaction of the various functional components shown within the device 100, whether that interaction actually take place over a physical bus structure or via software calls, request/response constructs, or any other such inter and intra component interface technologies, as will be appreciated.

Processor 132 can be implemented using any suitable processor, and may include one or more coprocessors or controllers, such as an audio processor or a graphics processing unit, to assist in processing operations of the device 100. Likewise, memory 134 can be implemented using any suitable type of digital storage, such as one or more of a disk drive, solid state drive, a universal serial bus (USB) drive, flash memory, random access memory (RAM), or any suitable combination of the foregoing. Operating system 136 may comprise any suitable operating system, such as Google Android, Microsoft Windows, or Apple OS X. As will be appreciated in light of this disclosure, the techniques provided herein can be implemented without regard to the particular operating system provided in conjunction with device 100, and therefore may also be implemented using any suitable existing or subsequently-developed platform. Communication adaptor 140 can be implemented using any appropriate network chip or chipset which allows for wired or wireless connection to a network and/or other computing devices and/or resource. The device 100 also include one or more I/O components 138, such as one or more of a tactile keyboard, a display, a mouse, a touch sensitive display, a touch-screen display, a trackpad, a microphone, a camera, scanner, and location services. In some embodiments, the device 100 includes, or is communicatively coupled to, a display screen 142. Thus, in an example, the display screen 142 can be a part of the device 100, while in another example the display screen 142 can be external to the device 100. In general, other standard componentry and functionality not reflected in the schematic block diagram of FIG. 1 will be readily apparent, and it will be further appreciated that the present disclosure is not intended to be limited to any specific hardware configuration. Thus, other configurations and subcomponents can be used in other embodiments.

Also illustrated in FIG. 1 is the image parsing system 102 implemented on the device 100. In an example embodiment, the image parsing system 102 comprises an image parsing pipeline 103 (also referred to herein as pipeline 103) comprising multiple pipeline stages, such as object detection module 104, segmentation module 106, and refinement module 108. The pipeline 103 receives the image 111, and parses the image to generate a parsed image 117 (also referred to herein as a final mask image 117). In some embodiments, various stages of the pipeline 103, such as the modules 104, 106, and 108, are implemented using corresponding trained neural network. The stages of the pipeline 103 will be discussed in further detail herein later.

Figure 2:
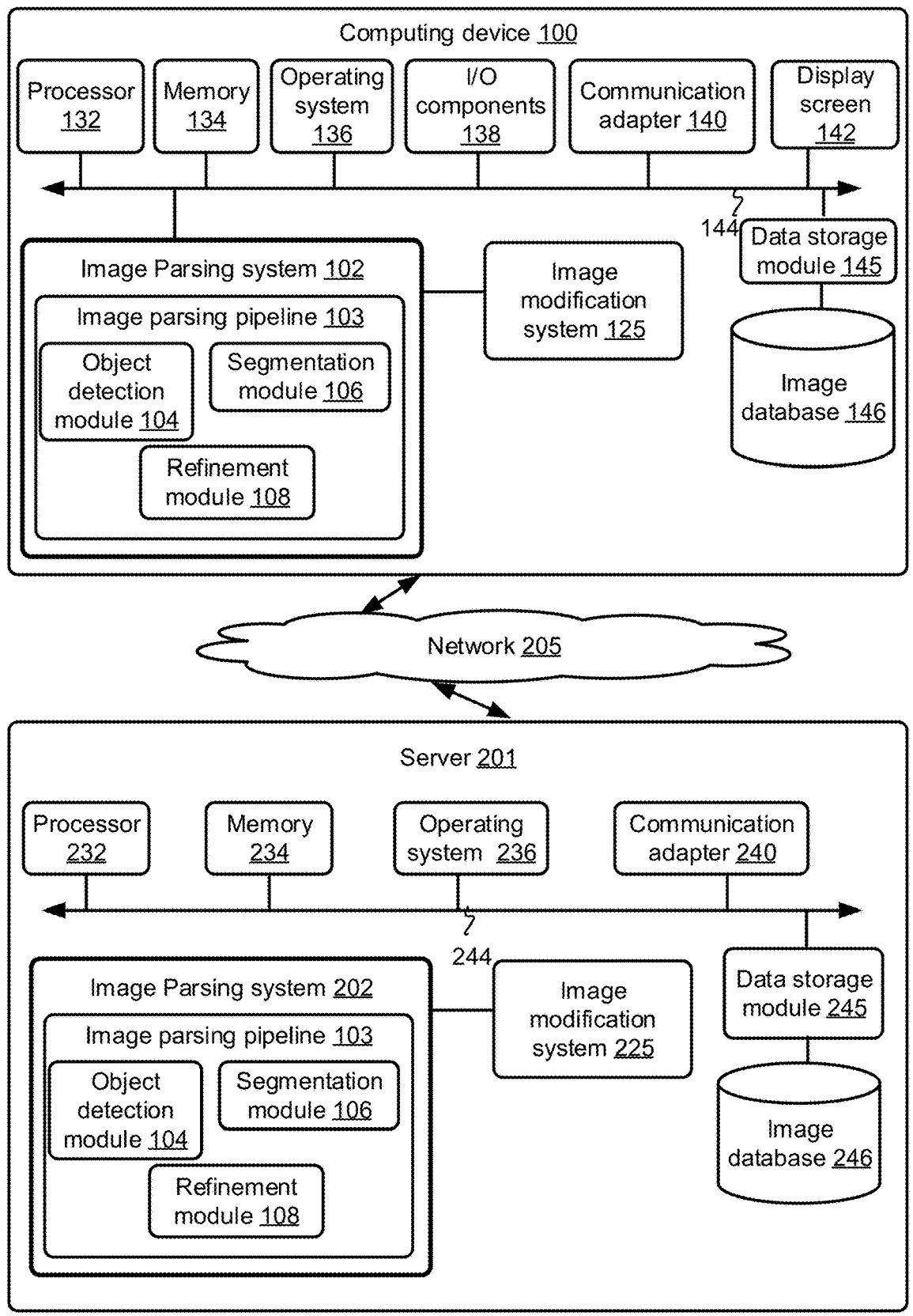
FIG. 2 is a block diagram schematically illustrating selected components of an example system comprising the computing device of FIG. 1 communicating with server device(s), where the combination of the computing device and the server device(s) are configured to parse an image and optionally modify the parsed image, in accordance with some embodiments of the present disclosure.

FIG. 2 is a block diagram schematically illustrating selected components of an example system 200 comprising the computing device 100 of FIG. 1 communicating with server device(s) 201, where the combination of the device 100 and the server device(s) 201 (henceforth also referred to generally as server 201) are configured to parse an image and optionally modify the parsed image, in accordance with some embodiments of the present disclosure.

In an example, the communication adaptor 140 of the device 100 can be implemented using any appropriate network chip or chipset allowing for wired or wireless connection to network 205 and/or other computing devices and/or resources. To this end, the device 100 is coupled to the network 205 via the adaptor 140 to allow for communications with other computing devices and resources, such as the server 201. The network 205 is any suitable network over which the computing devices communicate. For example, network 205 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

In one embodiment, the server 201 comprises one or more enterprise class devices configured to provide a range of services invoked to provide image parsing and/or image modification services, as variously described herein. Examples of such services include receiving an image 111; parsing the image 111 to generate a parsed image 117, where the parsed image includes identification of various segments of various objects of the image; and optionally modifying the image 111. Although one server 201 implementation of the image parsing system 202 and image modification system 125 is illustrated in FIG. 2, it will be appreciated that, in general, tens, hundreds, thousands, or more such servers can be used to manage an even larger number of image parsing and/or modification operations.

In the illustrated embodiment, the server 201 includes one or more software modules configured to implement certain of the functionalities disclosed herein, as well as hardware configured to enable such implementation. These hardware and software components may include, among other things, a processor 232, memory 234, an operating system 236, the image parsing system 202 (also referred to as system 202), the image modification system 225, data storage module 245, and a communication adaptor 240. An image document database 246 (e.g., that comprises a non-transitory computer memory) stores at least one or more images that are to be parsed and/or modified, and also stores the modified image. A bus and/or interconnect 244 is also provided to allow for inter- and intra-device communications using, for example, communication adaptor 240 and/or network 205. Note that components like the operating system 236, the image parsing system 202, and the image modification system 225 can be software modules that are stored in memory 234 and executable by the processor 232. The previous relevant discussion with respect to the symbolic nature of bus and/or interconnect 144 is equally applicable here to bus and/or interconnect 244, as will be appreciated.

Processor 232 is implemented using any suitable processor, and may include one or more coprocessors or controllers, such as an audio processor or a graphics processing unit, to assist in processing operations of the server 201. Likewise, memory 234 can be implemented using any suitable type of digital storage, such as one or more of a disk drive, a universal serial bus (USB) drive, flash memory, random access memory (RAM), or any suitable combination of the foregoing. Operating system 236 may comprise any suitable operating system, and the particular operation system used is not particularly relevant, as previously noted. Communication adaptor 240 can be implemented using any appropriate network chip or chipset which allows for wired or wireless connection to network 205 and/or other computing devices and/or resources. The server 201 is coupled to the network 205 to allow for communications with other computing devices and resources, such as the device 100. In general, other componentry and functionality not reflected in the schematic block diagram of FIG. 2 will be readily apparent in light of this disclosure, and it will be further appreciated that the present disclosure is not intended to be limited to any specific hardware configuration. In short, any suitable hardware configurations can be used.

The server 201 can generate, store, receive, and transmit any type of data, including images to be parsed/that have been parsed. As shown, the server 201 includes the image parsing system 202 that communicates with the system 102 on the client device 100. In an example, the image parsing features discussed with respect to FIG. 1 can be implemented in FIG. 2 exclusively by the image parsing system 102, exclusively by the image parsing system 202, and/or may be shared between the image parsing systems 102 and 202. Thus, in an example, none, some, or all image parsing features are implemented by the image parsing system 102. Similarly, in an example, the image modification features discussed with respect to FIG. 1 can be implemented in FIG. 2 exclusively by the image modification system 125, exclusively by the image modification system 225, and/or may be shared between the image modification systems 125 and 225. For example, when located in the server 201, the image parsing system 202 comprises an application running on the server 201 or a portion of a software application that can be downloaded to the device 100. For instance, the system 102 can include a web hosting application allowing the device 100 to interact with content from the system 202 hosted on the server 201. In this manner, the server 201 parses one or more images, and optionally modifies the images.

Thus, the location of some functional modules in the system 200 may vary from one embodiment to the next. Any number of client-server configurations will be apparent in light of this disclosure. In still other embodiments, the techniques may be implemented entirely on a user computer, e.g., simply as stand-alone image parsing application. Similarly, while the image database 146 is shown on the client side in this example case, it may be on the server side in other embodiments, such as the cloud-based image database 246. Thus, the image database can be local or remote to the device 102, so long as it is accessible by the image parsing system 102 that is implemented by the system 102 or implemented by the system 202.

Figure 3:
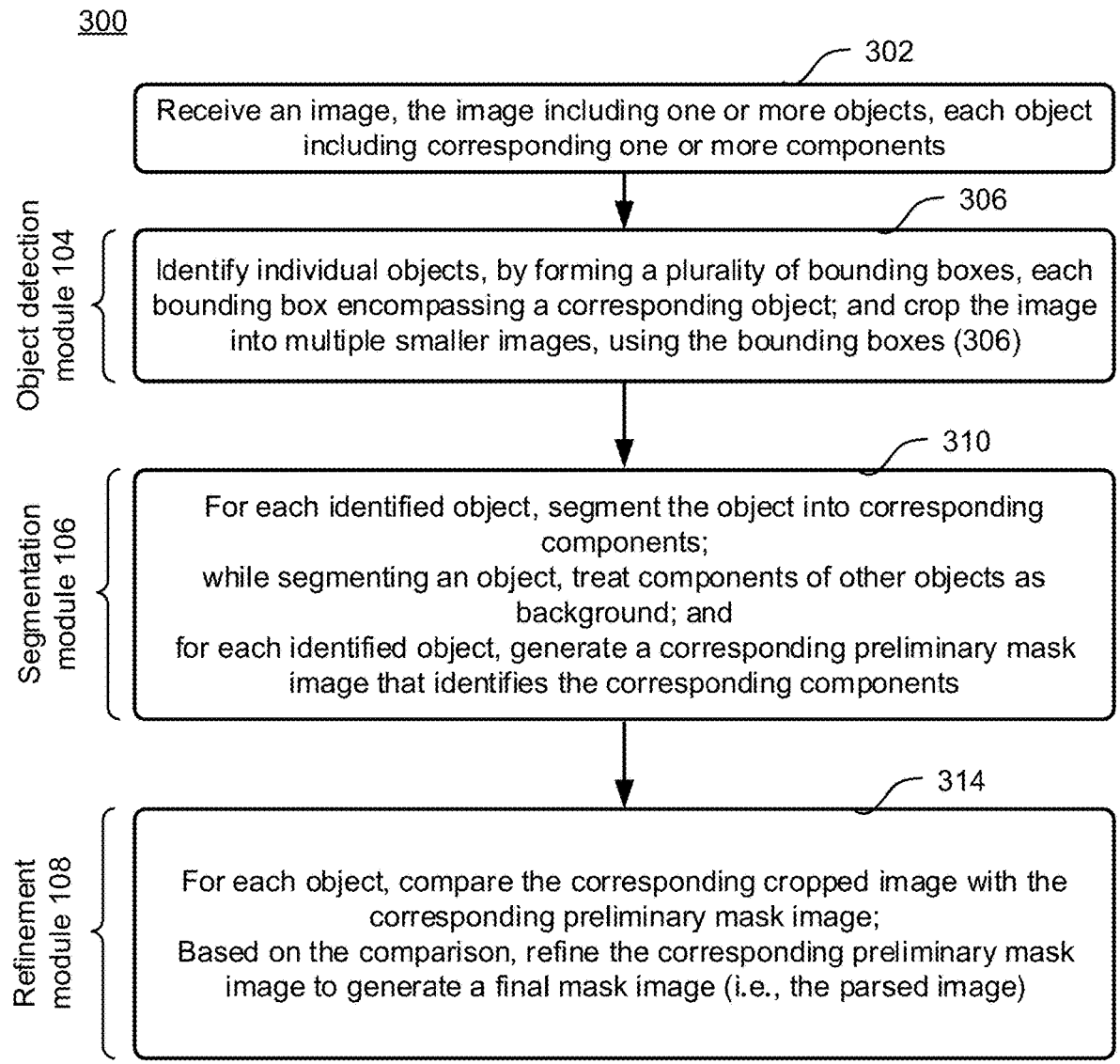
FIG. 3 is a flowchart illustrating an example method for parsing an image, to identify different segments associated with one or more objects within the image, in accordance with some embodiments of the present disclosure.

FIG. 3 is a flowchart illustrating an example method 300 for parsing an image, to identify different segments associated with one or more objects within the image, in accordance with some embodiments of the present disclosure. Method 300 can be implemented, for example, using the system architecture illustrated in FIGS. 1 and/or 2, and described herein, e.g., using the image parsing system 102. However other system architectures can be used in other embodiments, as apparent in light of this disclosure. To this end, the correlation of the various functions shown in FIG. 3 to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system. For example, in an alternative embodiment, a first server may implement a first stage (e.g., module 104) of the pipeline 103, and a second server may implement a second stage (e.g., module 106) of the pipeline 103. In yet another embodiment, a client device (such as device 100, instead of a server) may parse the image and/or may provide functionality associated with at least one or more stages of the pipeline 103. Thus, although various operations of the method 300 are discussed herein as being performed by the image parsing system 102 of the computing device 100, one or more of these operations can also be performed by the image parsing system 202 of the server 201 as well.

Figure 4A:
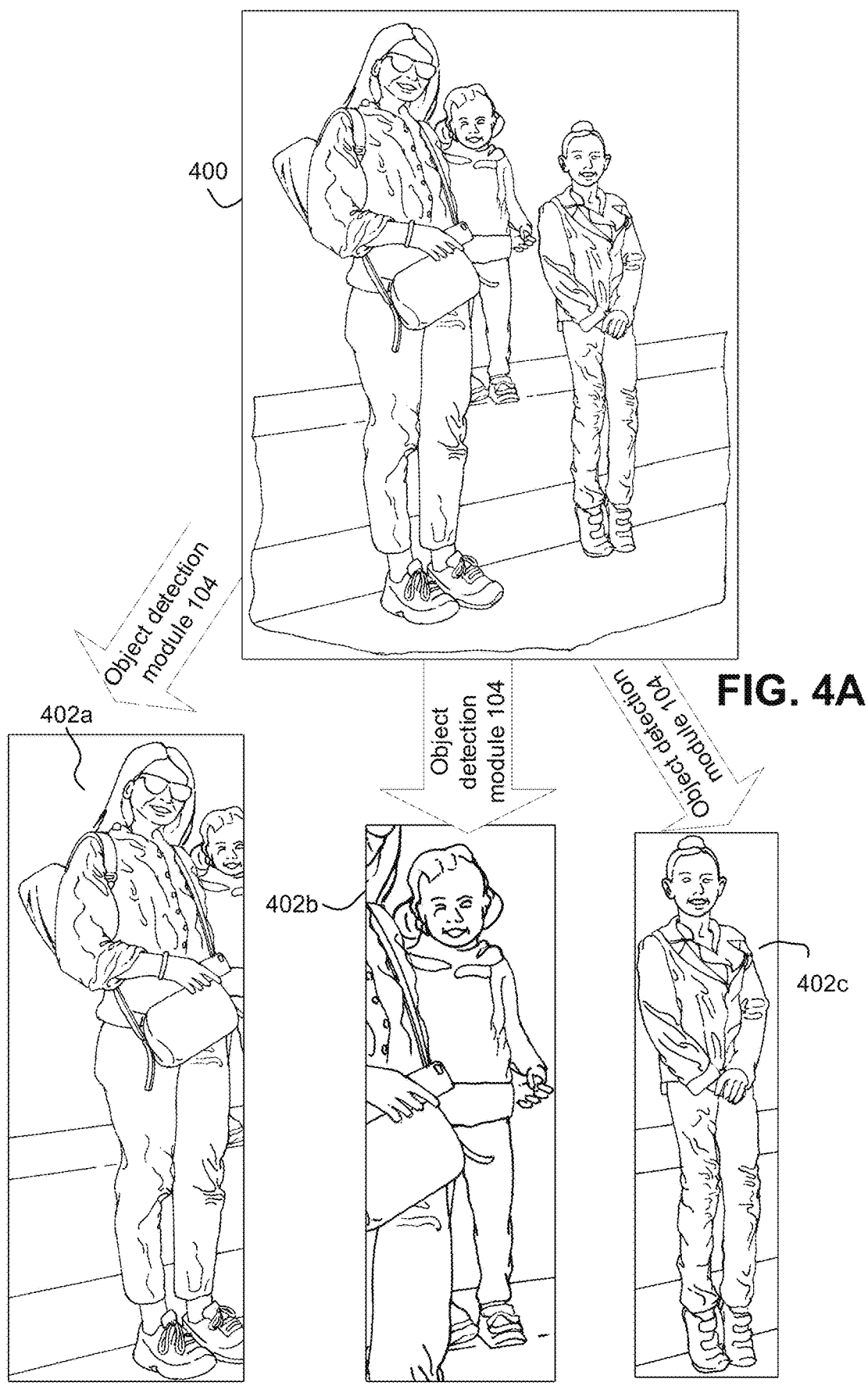

FIGS. 4A, 4B1, 4B2, 4B3, 4C1, 4C2, and 4C3 illustrate various example images associated with the method 300, in accordance with some embodiments of the present disclosure. The method 300 and FIGS. 4A-4C3 are discussed in unison.

Referring to the method 300, at 302, the image parsing system 102 receives an image, such as the image 400 of FIG. 4A. In some embodiments, the received image includes one or more objects, where each object includes corresponding one or more segments. Note that while the image 400 in the example of FIG. 4A is a line drawing, a photographed image can also be used instead. Similarly, while the image 400 is a black and white image, a color image can also be used.

In the example image 400 of FIG. 4A, the objects of the image are persons, and thus, FIGS. 4A-4C3 are associated with parsing of a source image including multiple humans. However, the scope of the disclosure is not limited to the objects being human only. In other examples, the objects to be segmented can be animals, trees, insects, and/or inanimate objects like buildings, rooms, furniture, etc.

For the example of FIGS. 4A-4C3, the segments associated with the objects include human body parts, such as hair, face, hand, legs, and/or any other appropriate human body parts. The segments also include, in some examples, dress worn by a person and/or accessories carried by the person. Examples of such dress and accessories can include shirt, pant, eye glasses, shoes, cell phone, bag, watch, backpack, and/or any other appropriate dress or accessory worn by and/or in close proximity with the human object.

For example, referring to FIG. 4A, the image 400 received at 302 includes three persons. For the sake of ease of identification, the persons in the image 400 are referred to, from left to right, as an adult, a child, and a teenager. There is also background scenery in the image 400, such as the pavement, and an elevated platform on which the child is standing. The persons in the image 400 are wearing respective dresses. Additionally, the adult in the image 400 has accessories, such as a backpack, a purse, and a cellphone in her hand.

Referring again to FIG. 3, the method 300 proceeds from 302 to 306. At 306, the object detection module 104 identifies individual objects in the received image. For example, the object detection module 104 forms a plurality of bounding boxes, where each bounding box encompasses a corresponding object. Subsequently, the object detection module 104 crops the image into multiple smaller images, using the bounding boxes.

For example, FIG. 4A illustrates a first object within a first cropped image defined by a first bounding box 402a, where the first object is the adult in the image 400. FIG. 4A also illustrates a second object within a second cropped image defined by a second bounding box 402b, where the second object is the child in the image 400. FIG. 4A also illustrates a third object within a third cropped image defined by a third bounding box 402c, where the third object is the teenager in the image 400.

Although 306 of the method 300 discusses the identification process with respect to formation of bounding boxes, in some embodiments, the identification at 306 may not necessarily be restricted to formation of bounding boxes. For example, instead of forming a bounding box, the object detection module 104 can otherwise identify an object within the image 400, e.g., by identifying and masking individual pixels in the image that belong to the object to be identified.

In the example of FIG. 4A, the bounding boxes 402a, 402b, 402c are illustrated as being rectangular. However, in some embodiments, the bonding boxes need not necessarily be rectangular in shape. For example, in some embodiments, a bounding box can be irregular shaped, along a boundary of the object to be identified by the bounding box.

In some embodiments, the object detection module 104 can form a bounding box by generating coordinates of the bounding box. For example, the object detection module 104 can specify coordinates of four corners of a bounding box within the image 400. In another example, the object detection module 104 can specify a height, a width, and a center of the bounding box within the image.

In some embodiments, one or more trained neural network (NN) models are used to implement the object detection module 104. In some embodiments, the object detection module is implemented, merely as an example, using a faster Region Based Convolutional Neural Network (Faster-RCNN) model, although any other appropriate NN model may be used. In some embodiments, the NN model for the object detection module 104 is trained using multiple categories of objects, such as person, man, woman, boy, girl, as well as body parts such as human face, head, eye, hair, face, beard, ear, hand, arm, leg, foot, and/or other personal belongings (e.g., bag, hat, sunglass, shoe, skirt, belt, dress, cell phone).

In some embodiments, the object detection module 104 can be trained and/or configured to detect objects belonging to categories, such as "human" or "person"—in such a scenario, the object detection module 104 can detect the three persons, as illustrated in FIG. 4A, without being able to specify whether the persons are man, woman, child, boy, or girl.

However, in some embodiments, the object detection module 104 can be trained and/or configured to detect objects belonging to sub-categories of human, such as man, woman, child, boy, or girl—in such a scenario, the object detection module 104 can identify that the person within the bounding box 402a is a woman, the person within the bounding box 402b is a child, and the person within the bounding box 402c is a girl. This identification of specific sub-categories of human can enhance the detection accuracy. In some embodiments, the object detection module 104 can be trained and/or configured to detect individual segments of various objects belonging to human, such as various body parts (e.g., hand, hair, arm, leg, foot) and other belonging objects (e.g., bag, shoe, sunglass, scarf, hat).

Referring again to FIG. 3, the method 300 then proceeds from 306 to 310. At 306, the segmentation module 106 segments each identified object into corresponding segments. While segmenting an object, the segmentation module 106 aims to treat segments of other objects as background. Based on segmenting an object, the segmentation module 106 generates a corresponding preliminary mask image that identifies the corresponding segments of the object.

For example, FIG. 4B1 illustrates a preliminary mask image 404a that identifies the segments of the object (e.g., the adult in the image 400) of the bounding box 402a. FIG. 4B2 illustrates a preliminary mask image 404b that identifies the segments of the object (e.g., the child in the image 400) of the bounding box 402b. Finally, FIG. 4B3 illustrates a preliminary mask image 404c that identifies the segments of the object (e.g., the teenager in the image 400) of the bounding box 402c.

Referring to the preliminary mask image 404a of FIG. 4B1 as an example, individual pixel of the image 404a is assigned a specific flag or label that identifies a segment to which the pixel belongs. For example, in the preliminary mask image 404a, a shirt of the adult person is illustrated using red, a face is illustrated using pink, pants are illustrated using violet, hairs are illustrated using light orange color, background is illustrated using blue color, and so on. Merely as an example and for purposes of illustration, the segments of the preliminary mask image 404a are illustrated using different color, although the segmentation module 106 may not actually assign colors to the different segments. Rather, merely as an example, the segmentation module 106 assigns a first value or label to pixels of the preliminary mask image 404a that are identified as hair, assigns a second value or label to pixels of the preliminary mask image 404a that are identified as face, assigns a third value or label to pixels of the preliminary mask image 404a that are identified as shirt, and so on. Thus, a specific color in FIGS. 4B1-4B3 implies that the associated pixels are assigned a corresponding specific label, to identify that all such pixels are associated with a corresponding specific segment.

In some embodiments, for assigning the labels, initially, the segmentation module 106 assigns, to each pixel, one or more probability values corresponding to one or more segments. In response to a probability value corresponding to a specific segment being higher than a threshold value, the segmentation module 106 labels the pixel to be belonging to the specific segment. For example, a pixel can be assigned a first probability value (e.g., 0.8) of being a hair, a second probability value (e.g., 0.2) of being a face, and a third probability value (e.g., 0.0) of being a leg. In such an example, in response to the first probability value being higher than the threshold value, the pixel is labeled to be a hair, and the pixel is illustrated in the color (e.g., light orange color) associated with the hair in the preliminary mask image 404a.

Furthermore, as discussed, during the segmentation process, the segmentation module 106 aims to, while segmenting an object, treat segments of other objects as background. Thus, for example, in the preliminary mask image 404a, most body parts of the child, pavement, the road, and other background components are illustrated in blue color of the background. Thus, the segmentation module 106, while segmenting the adult of the bounding box 402a, treats segments or body parts of the child as background.

In some embodiments, the segmentation module 106 differentiates between, for example, left hand and right hand, between left foot and right foot, between left shoe and right shoe, and/or between a left segment of a person and a right segment of the person. That is, the segmentation module 106 assigns a first label to the left hand and a different second label to the right hand.

However, in some other embodiments, the segmentation module 106 does not differentiate between, for example, a left segment of a person and a right segment of the person, as is the case in the example of FIGS. 4B1-4B3. In such an embodiment, for instance, the left hand and right hand are assigned the same label. For example, as the underlying CNNs of the segmentation module 106 are translation invariant, the left-hand and the right-hand labels can be merged into a single label called hand. Likewise, the left shoe and the right shoe labels can be merged into a single label called shoe. Other left and right features of a human or other object can be similarly treated. This allows the use various data augmentation techniques, such as left-right flip, without further consideration.

In some example, due to limitations in implementation of the segmentation module 106, there can be some deficiencies in the segmentation process. For example, referring to FIG. 4B1, as illustrated within an oval box 405 in the preliminary mask image 404a, the segmentation module 106 identifies part of the child's hair, although the body parts of the child should have been considered as background. As an example, the segmentation module 106 may have mistakenly identified part of the hair of the child as that of the adult.

Similarly, referring to FIG. 4B2, as illustrated within an oval box 407 in the preliminary mask image 404b, the segmentation module 106 mistakenly identifies part of the adult's hand as that of the child, although the adult's hand should have been considered as background.

In another example, still referring to FIG. 4B2, as illustrated within oval boxes 409a and 409b in the bounding box 402b, the segmentation module 106 fails to identify part of the right leg and right shoe of the child in the preliminary mask image 404b.

In some embodiments, the segmentation module 106 (also referred to as semantic segmentation model) is implemented using a pre-trained NN model. For example, the segmentation module 106 is a variant of the Unet architecture (e.g., which is a convolutional neural network), with a ResNet34 backbone. In another example, the segmentation module 106 is a DeepCut neural network architecture, which is trained to compress the model size by a factor of 100 using a neural rejuvenation technique. In an example, the segmentation module 106 can be implemented using a relatively large and relatively more accurate Unet-based model, or a relatively small and compressed DeepCut-based model. In an example, the relatively large (e.g., about 400 MB) and relatively more accurate Unet-based model may be suitable for deployment in cloud-based applications, such as when the image parsing system 202 within the server 201 of FIG. 2 is used. In an example, the relatively small (e.g., about 4 MB) and compressed DeepCut-based model may be suitable for deployment in mobile applications, such as when the image parsing system 102 within the device 100 of FIGS. 1 and 2 is used.

In some embodiments, the segmentation module 106 is pre-trained using available training dataset that includes images that have been segmented using human annotators. In an example, as such a training dataset is limited in the number of included images (e.g., as human annotator has to manually segment the objects), transfer learning technique is used for training the NN model of the segmentation module 106. In an example, transfer learning helps to obtain relatively better segmentation results with a relatively small training dataset. For example, when the segmentation module 106 has to segment humans in an image, the segmentation module 106 can be initially trained using the relatively small training dataset that comprises (i) images including segmentation of humans, and (ii) also images including segmentation of non-human objects. Once the segmentation module 106 is trained on segmentation of humans and non-human objects, transfer learning techniques are implemented to further train the segmentation module 106 for specifically segmenting human body parts.

In an example, the segmentation module 106 is pretrained on ImageNet dataset for classification task and COCO dataset for semantic segmentation task. For example, the ImageNet project is a large visual database designed for use in visual object recognition software research. More than 14 million images have been hand-annotated by the project to indicate what objects are pictured, and in at least one million of the images, bounding boxes are also provided. ImageNet contains more than 20,000 categories. For example, the COCO dataset is an object detection dataset with 80 classes, 80,000 training images and 40,000 validation images. Although some example training datasets are discussed herein above, the principles of this disclosure are not limited to training using such specific training datasets.

Referring again to FIG. 3, the method 300 then proceeds from 310 to 314, where the refinement module 108 refines a preliminary mask image to generate a corresponding final mask image. For example, for each object, the refinement module 108 compares the corresponding cropped image with the corresponding preliminary mask image, and generates the corresponding final mask image based on such comparison.

For example, FIG. 4C1 illustrates generation of final mask image 406a from the preliminary mask image 404a for the object "adult" of the bounding box 402a of the image 400. Similarly, FIG. 4C2 illustrates generation of final mask image 406b from the preliminary mask image 404b for the object "child" of the bounding box 402c of the image 400. Similarly, FIG. 4C3 illustrates generation of final mask image 406c from the preliminary mask image 404c for the object "teenager" of the bounding box 402c of the image 400.

The refinement process of 314 cures possible inaccuracies in the preliminary mask images, and improves the body part segmentation process. For example, as discussed with respect to 405 of FIG. 4B1, sections of the child's hair were erroneously included in the preliminary mask image 404a as being a segment (e.g., a hair segment) of the adult. However, as illustrated in FIG. 4C1, during the refinement process, the child's hair is removed from the final mask image 406a.

Similarly, as discussed with respect to 407, 409a, 409b of FIG. 4B2, there were some inaccuracies in the preliminary mask image 404b. However, as illustrated in FIG. 4C2, during the refinement process, these inaccuracies are correctly addressed, and the final mask image 406b does not include such inaccuracies. For example, sections of the child's right leg 411a and right shoe 411b, which were absent in the preliminary mask image 404b, are included in the final mask image 406b.

Referring back to the segmentation process at 310, the segmentation process can be prone to errors caused by image compression noise, color similarity between masked and unmasked areas, and/or other any other possible reasons. In some embodiments, the segmentation module 106 generates a soft probabilistic segmentation mask for in the preliminary mask images. A preliminary mask image can be regarded as an image where the pixel values represent the probability of being selected. Take the hair segmentation as an example. The segmentation module 106 highlights the area of the hair with high probability values, and suppress the non-hair area with low probability values. The areas having a high probability of being hair are illustrated using the corresponding light orange color in the preliminary mask images.

In an example, there can be fuzzy areas on the preliminary mask image, about which the segmentation module 106 is not sure. For example, such areas may be assigned by a medium probability, instead of a high probability. For example, a pixel can be assigned a probability value of 0.6 of being a hand, a probability value of 0.2 of being a wrist watch, and a probability value of 0.2 of being a handbag, and a zero-probability value of being a leg. In such an example, the pixel is illustrated in the color associated with the hand, but there is some fuzziness involved in the segmentation performed by the segmentation module 106. In an example, the refinement module 108 resolves such ambiguity associated with the segmentation process.

For example, assume an existing segmentation model S of the preliminary mask image formed by the segmentation module 106 from a source image I. Merely as an example, I is the source image within the bounding box 402a, and S is the existing segmentation model of the preliminary mask image 404a of FIG. 4B1. The preliminary mask image is a function of the source image, and hence, can be represented as S(I), implying that the preliminary mask image is a function S of the source image I. Assume that the refinement module 108 implements a function R that receives an input (a) the source image I, and (b) the segmentation mask SM. The refinement module 108 generates a refined mask M as follows:

$$M=R(I \oplus S(I)).$$ Equation 1

Figure 5:
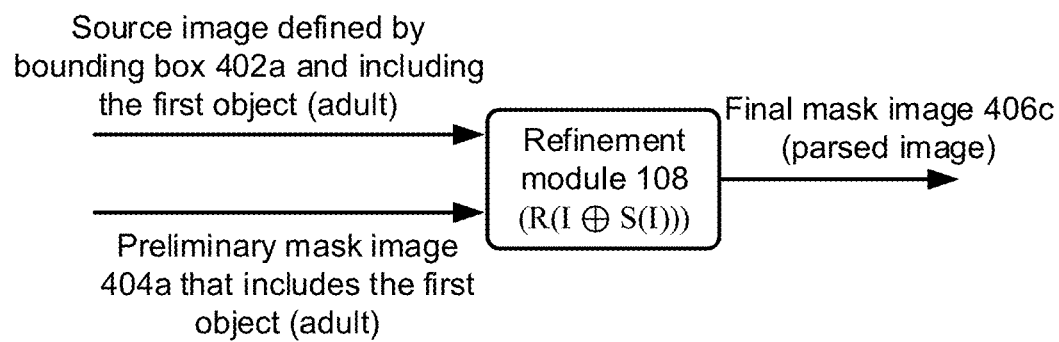
FIG. 5 illustrates operation of a refinement module of an image parsing pipeline, in accordance with some embodiments of the present disclosure.

In equation 1, $\oplus$ denotes channel-wise concatenation of the source image I and the preliminary mask image S(l). FIG. 5 illustrates operation of the refinement module 108 of FIGS. 1 and 2, in accordance with some embodiments of the present disclosure. For example, as discussed, the refinement module 108 receives (i) the source image defined by the bounding box 402a that includes the first object (adult) of FIGS. 4A, 4B1, and (ii) the preliminary mask image 404a that includes the first object (adult) of FIGS. 4B1, 4C1. The refinement module 108 generates the refined image, which is the final mask image 406c (also referred to as parsed image) of FIG. 4C1.

In some embodiments, the refinement module 108 can be implemented as an encoder-decoder network and/or using another appropriate NN based segmentation architecture. In some embodiments, RefineNet (Multi-path Refinement Network for Semantic Segmentation) can be used to implement the refinement module 108. In some embodiments, a relatively light-weight fully convolutional network (FCN) may be used to implement the refinement module 108.

As discussed herein, the final mask image 406c identifies various segments of an object, where the object in this example is the adult in the image 400 of FIG. 4A. Parsing or segmenting each object within an image that includes multiple objects, by identifying various segments of each object, is achieved by the image parsing pipeline 103. Decomposing the segmentation problem into three stages reduces the complexity of the problem, and makes it easier to further improve each part of the pipeline in isolation.

Figure 6:
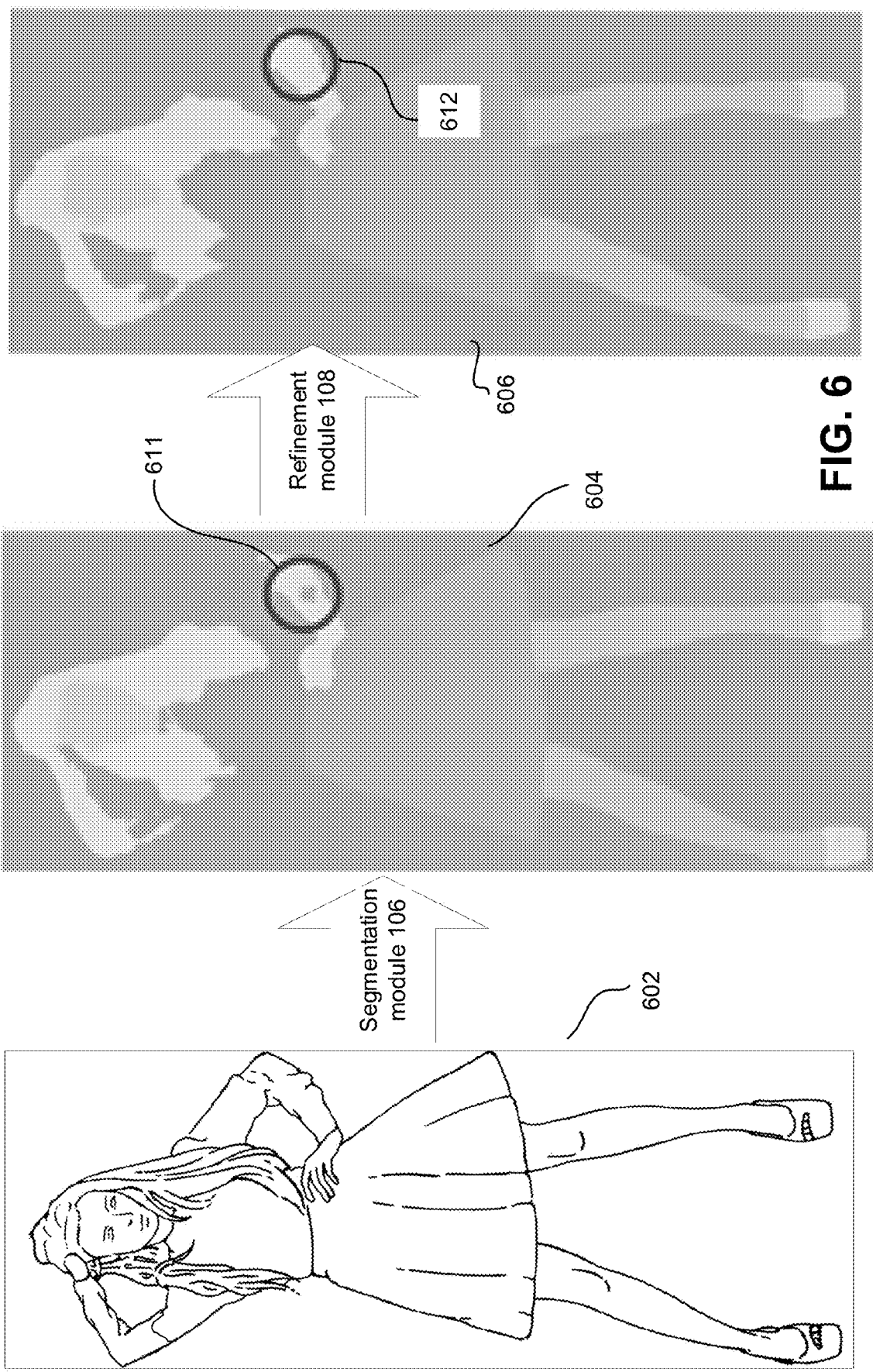
FIG. 6 illustrates an example image being parsed by an image parsing pipeline, in accordance with some embodiments of the present disclosure.

FIG. 6 illustrates an example image 602 being parsed by the image parsing pipeline 103 of FIGS. 1 and 2, in accordance with some embodiments of the present disclosure. Note that while the image 602 is a line drawing, a photographed image can also be used instead. Similarly, while the image 602 is a black and white image, a color image can also be used. In the example of FIG. 6, the original image 602 includes a single object (a person), due to which the object detection module 104 outputs the original image 602 as including the single object. The segmentation module 106 generates a preliminary mask image 604. Illustrated within a circle 611 in the preliminary mask image 604 are some inaccuracies. For example, the segmentation module 106 mistakenly labels a section of the hand of the person as background in the preliminary mask image 604. The refinement module 108 generates the final mask image 606, which is also referred to as parsed image 606, by further refining the preliminary mask image 604. In the refined final mask image 606, the inaccuracies within a circle 612 (which corresponds to the circle 611 of the preliminary mask image 604) is cured, and the entire hand is correctly being labeled as being a hand.

Figure 7:
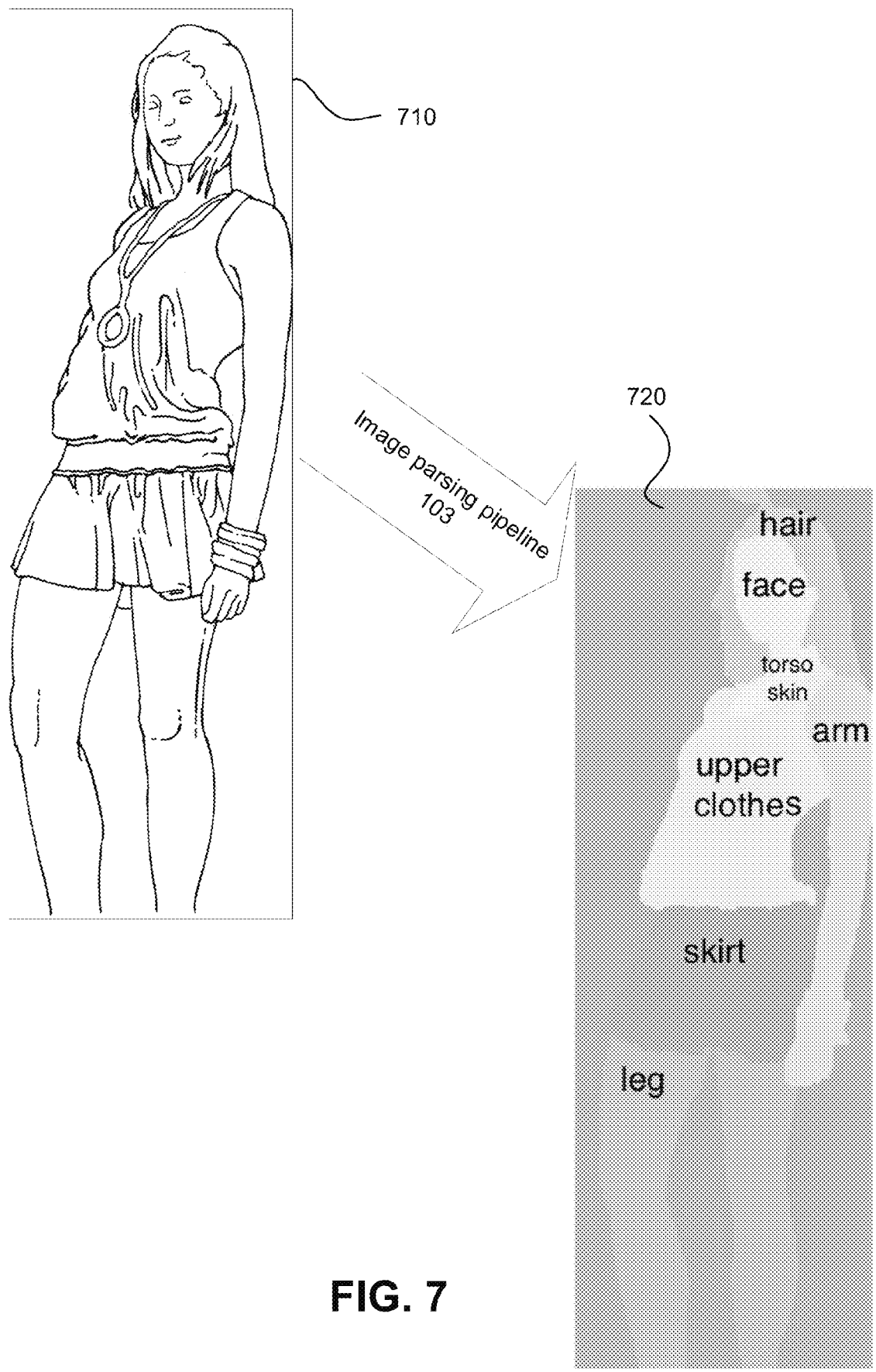
FIG. 7 illustrates an example source image received by an image parsing pipeline, and a corresponding parsed image that is output by the image parsing pipeline, in accordance with some embodiments of the present disclosure.

FIG. 7 illustrates an example source image 710 input to the image parsing pipeline 103 of FIGS. 1 and 2, and a corresponding parsed image 720 that is output by the image parsing pipeline 103, in accordance with some embodiments of the present disclosure. Note that while the image 710 is a line drawing, a photographed image can also be used instead. Similarly, while the image 710 is a black and white image, a color image can also be used.

As illustrated, the parsed image 720 is the final mask image, which includes various masks associated with various segments of the object. For example, the persons hair, face, arm, skirt and other parts are illustrated using different colors, as discussed with respect to FIGS. 3-6. Thus, the parsed image 720 identifies various segments of the object in the source image 710.

Figure 8:
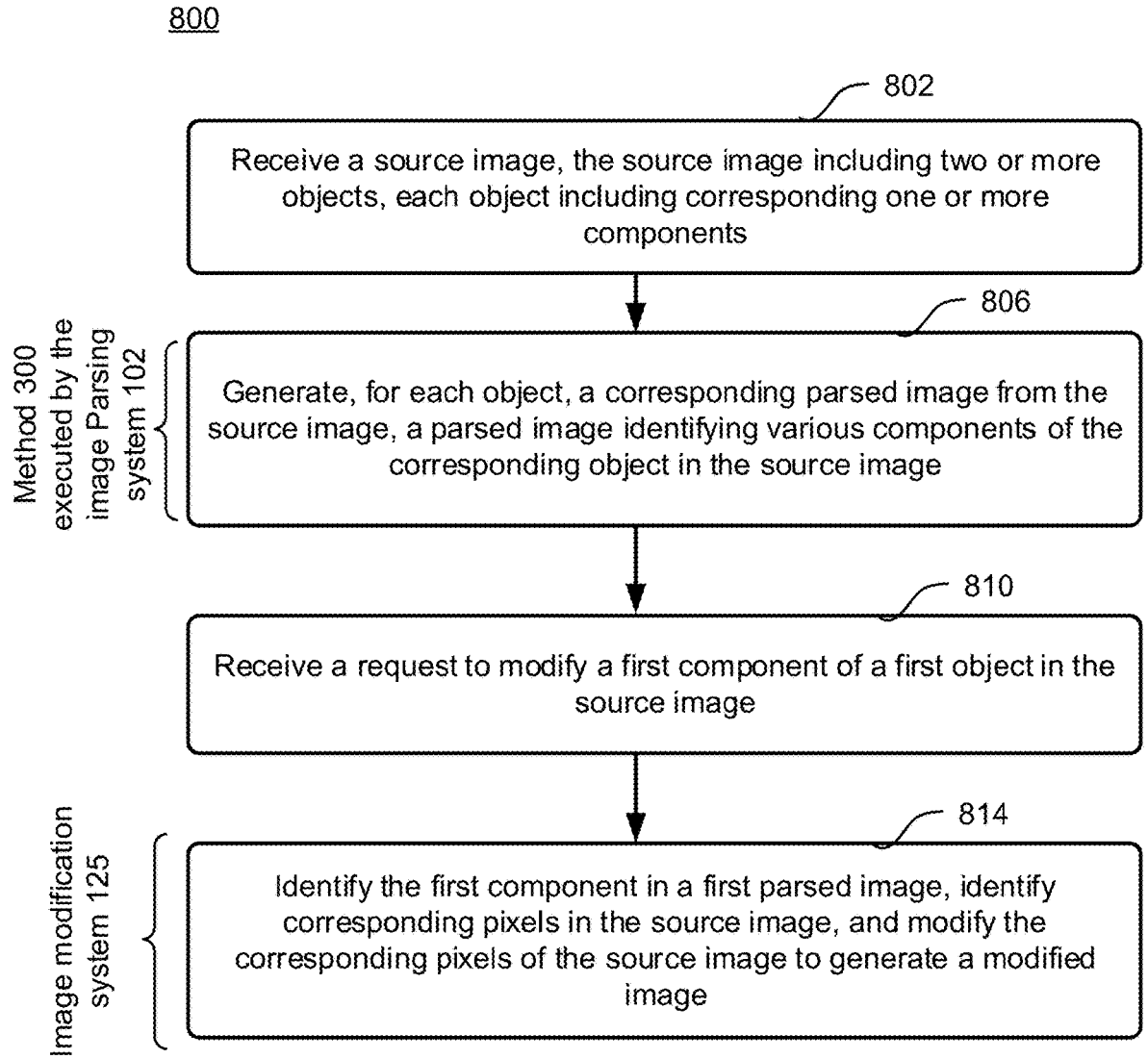
FIG. 8 is a flowchart illustrating an example method for modifying an image, based on parsing the image to identify various segments associated with one or more objects within the image, in accordance with some embodiments of the present disclosure.

FIG. 8 is a flowchart illustrating an example method 800 for modifying an image, based on parsing the image to identify various segments associated with one or more objects within the image, in accordance with some embodiments of the present disclosure. Method 800 can be implemented, for example, using the system architecture illustrated in FIGS. 1 and/or 2, and described herein, e.g., using the image parsing system 102 and the image modification system 125. However other system architectures can be used in other embodiments, as apparent in light of this disclosure. To this end, the correlation of the various functions shown in FIG. 8 to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system. For example, in an alternative embodiment, a first server may implement the image parsing system, and a second server may implement the image modification system. In yet another embodiment, a client device (such as device 100, instead of a server) may parse the image and/or may modify the image. Thus, although various operations of the method 800 are discussed herein as being performed by the image parsing system 102 and the image modification system 125 of the computing device 100, one or more of these operations can also be performed by the image parsing system 202 and/or the image modification system 225 of the server 201 as well.

At 802, a source image is received. In some embodiments, the source image includes one or more objects, each object including corresponding one or more segments, as discussed with respect to FIG. 3.

At 806, the image parsing system 102 generates, for each object of the source image, a corresponding parsed image. As discussed, a parsed image identifies various segments of the corresponding object in the source image. The operations at 806 have been discussed in further details with respect to the method 300 of FIG. 3. For example, for the source image 400 of FIG. 4A, the parsed image 406a of FIG. 4C1 is generated for a first object (e.g., adult in the image 400), the parsed image 406b of FIG. 4C2 is generated for a second object (e.g., child in the image 400), and the parsed image 406c of FIG. 4C3 is generated for a third object (e.g., teenager in the image 400). The parsed images are generated by the image parsing pipeline 103 of FIGS. 1 and 2, as discussed herein.

At 810, a request is received (e.g., by the computing device 100 of FIGS. 1 and 2) to modify a first segment of a first object in the source image. Merely as an example, the request can be to change a hair color of the adult in the source image 400, to change a color of the shirt of the adult in the source image 400, to change a design of the handbag of the adult in the source image 400, to change a design and/or color of shoes of the teenager in the source image 400, or another appropriate request to otherwise modify a segment that has been identified in one of the parsed images 406a, 406b, 406c. The request can be received from a user, via the I/O components 138 of the device 100.

At 814, the image modification system 125 identifies the first segment in a corresponding first parsed image. For example, if the request is to change the hair color of the adult in the source image 400, the image modification system 125 identifies the hairs of the adult (e.g., light orange) in the parsed image 406a of FIG. 4C1. For example, the image modification system 125 identifies the pixels in the parsed image 406a of FIG. 4C1 representing the adult hairs, where all these pixels are labeled using a label of hair. Based on identifying the hair pixels in the parsed image 406a, the image modification system 125 identifies the pixels representing hairs in the source image 400. Subsequently, the image modification system 125 modifies the corresponding pixels of the source image 400 to generate a modified image. For example, if the request is to change the hair color to white in the source image 400, as the image modification system 125 now knows the pixels representing the adult hairs in the source image 400, the image modification system 125 can change the color of those pixels from black to white in the source image 400, to generate the modified image.

Thus, as discussed herein, accurate segmentation and identification of segments of various objects in the source image (such as accurate segmentation and identification of human body parts) can help in selective modification of a specific segment of a specific object. Such segmentation and identification of segments of various objects in the source image can serve as a core technology for many creative applications, such as image and/or video editing applications, advertisement applications, and/or any other appropriate applications that requirement selective modification of one or more segments of a source image. The decomposed architecture using three deep learning modules (e.g., the three stages of the pipeline 103) with different architectures allows for expanding the models, and/or allows for greater flexibility in design and improvement in the pipeline.

Numerous variations and configurations will be apparent in light of this disclosure and the following examples.

Example 1. A method for parsing a source image that includes an object, the method comprising: identifying, by a first neural network model, a section of the source image that includes the object; generating, by a second neural network model and from the section of the source image, a preliminary mask image, the preliminary mask image identifying one or more segments of the object; comparing, by a third neural network model, the section of the source image and the preliminary mask image; and refining, by the third neural network and based on the comparison, the preliminary mask image to generate a refined mask image, the refined mask image representing a parsed version of the source image.

Example 2. The method of example 1, wherein the object is a first object, the section of the source image further includes at least a portion of a second object, and wherein the method further comprises: identifying at least the portion of the second object as background in the preliminary mask image and/or the refined mask image.

Example 3. The method of any of examples 1-2, wherein generating the preliminary mask image comprises: assigning, to a pixel of the section of the source image, a probability value of the pixel belonging to a specific segment of the object; and in response to the probability value being higher than a threshold value, labeling, in the preliminary mask image, the pixel to be belonging to the specific segment.

Example 4. The method of any of examples 1-3, wherein refining the preliminary mask image comprises fine-tuning a boundary of at least one segment of the object in the preliminary mask image to generate the refined mask image.

Example 5. The method of any of example 1-4, wherein the object is a first object, the section is a first section, the preliminary mask image is a first preliminary mask image, the one or more segments is a first one or more segments, the refined mask image is a first refined mask image, and wherein the method further comprises: identifying, by the first neural network model, a second section of the source image that includes a second object, wherein the second object comprises a second plurality of segments; generating, by the second neural network model and from the second section of the source image, a second preliminary mask image, the second preliminary mask image identifying a second one or more segments of the second object; comparing, by the third neural network model, the second section of the source image and the second preliminary mask image; and refining, by the third neural network and based on the comparison between the second section of the source image and the second preliminary mask image, the second preliminary mask image to generate a second refined mask image.

Example 6. The method of any of examples 1-5, wherein identifying the section of the source image comprises: identifying the object in the source image; and forming a bounding box in the source image, the bounding box encompassing the object, the bounding box defining the section of the source image.

Example 7. The method of any of examples 1-6, wherein refining the preliminary mask image to generate the refined mask image comprises: performing a channel-wise concatenation of the section of the source image and the preliminary mask image; and generating the refined mask image, based at least in part on performing the channel-wise concatenation.

Example 8. The method of any of examples 1-7, wherein the object is a human, and the one or more segments comprises one or more of (i) different human body parts including one or more of face, hair, arm, hand, and/or leg, (ii) one or more clothing articles worn by the human, including one or more of a shirt or top, a pant or legging, a vest, and/or a dress, skirt or kilt, and (iii) one or more accessories carried by the human, including one or more of a cell phone or computing device, a hand bag, a watch, a hat, eyeglasses, shoes, or a back-pack.

Example 9. The method of any of examples 1-8, further comprising: receiving a request to modify a design and/or color of a segment of the object; and modifying the source image, using the refined mask image, to generate a modified image, based on the request.

Example 10. The method of example 9, wherein generating the modified image comprises: identifying, using the refined mask image, one or more pixels in the source image that are associated with the segment of the object to the modified; and modifying the one or more pixels in the source image, to generate the modified image.

Example 11. The method of any of examples 1-10, wherein the object is a human, and wherein the method further comprises: training the second neural network model using images within a training data set, the images within the training data set including images of humans and images that exclude humans; and implementing a transfer learning technique to further train the second neural network model to identify human segments within images.

Example 12. A system to modify a segment of a human in a source image that includes at least the human, the system comprising: one or more processors; an image parsing pipeline executable by the one or more processors, the image parsing pipeline comprising an object detection module to detect the human in the source image, a segmentation module to generate a preliminary mask image that identifies a plurality of segments of the human in the source image, and a refinement module to refine the identification of the plurality of segments of the human in the preliminary mask image, and to generate a final mask image based on the refinement; and an image modification module executable by the one or more processors to modify a segment of the human in the source image, based on the final mask image identifying pixels of the segment to be modified.

Example 13. The system of example 12, wherein to detect the human in the source image, the object detection module is to: form a bounding box in the source image, the bounding box encompassing the human in the source image.

Example 14. The system of example 13, wherein: the human is a first human; the bounding box encompasses the first human and at least a section of a second human; and in the final mask image, the refinement module is to label at least the section of the second human as background.

Example 15. The system of example 14, wherein: in the preliminary mask image, the segmentation module is to erroneously identify at least the section of the second human as a segment of the first human.

Example 16. The system of any of examples 12-14, wherein to refine the identification of the plurality of segments of the human in the preliminary mask image, the refinement module is to: compare the source image and the preliminary mask image; and refine the identification of the plurality of segments of the human in the preliminary mask image and generate the final mask image, based on the comparison.

Example 17. A computer program product including one or more non-transitory machine-readable mediums encoded with instructions that when executed by one or more processors cause a process to be carried out for identifying segments of an object in a source image, the process comprising: detecting, by a first neural network model, the object within the source image; generating, by a second neural network model, a preliminary mask image that identifies a plurality of segments of the object; and generating, by a third neural network model, a final mask image, by refining the identification of the plurality of segments of the object in the preliminary mask image.

Example 18. The computer program product of example 17, wherein the first neural network model, the second neural network model, and the third neural network model are three different and distinct neural network models.

Example 19. The computer program product of any of examples 17-18, the process further comprising: modifying a segment of the object in the source image, based on the final mask image identifying one or more pixels that are associated with the segment.

Example 20. The computer program product of any of examples 17-19, wherein the object is a human, and the plurality of segments comprises one or more of (i) different human body parts including one or more of face, hair, hand, and/or leg, (ii) one or more dresses worn by the human, and (iii) one or more accessories carried by the human, including one or more of a cell phone, a hand bag, a shoe, eye glasses, or a back pack.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for parsing a source image that includes an object, the method comprising:
    identifying, by a first neural network model, a section of the source image that includes the object;
    generating, by a second neural network model and from the section of the source image, a preliminary mask image, the preliminary mask image identifying one or more segments of the object;
    comparing, by a third neural network model, the section of the source image and the preliminary mask image; and
    refining, by the third neural network and based on the comparison, the preliminary mask image to generate a refined mask image, the refined mask image representing a parsed version of the source image.

2. The method of claim 1, wherein the object is a first object, the section of the source image further includes at least a portion of a second object, and wherein the method further comprises:
    identifying at least the portion of the second object as background in the preliminary mask image and/or the refined mask image.

3. The method of claim 1, wherein generating the preliminary mask image comprises:
    assigning, to a pixel of the section of the source image, a probability value of the pixel belonging to a specific segment of the object; and
    in response to the probability value being higher than a threshold value, labeling, in the preliminary mask image, the pixel to be belonging to the specific segment.

4. The method of claim 1, wherein refining the preliminary mask image comprises fine-tuning a boundary of at least one segment of the object in the preliminary mask image to generate the refined mask image.

5. The method of claim 1, wherein the object is a first object, the section is a first section, the preliminary mask image is a first preliminary mask image, the one or more segments is a first one or more segments, the refined mask image is a first refined mask image, and wherein the method further comprises:

identifying, by the first neural network model, a second section of the source image that includes a second object, wherein the second object comprises a second plurality of segments;

generating, by the second neural network model and from the second section of the source image, a second preliminary mask image, the second preliminary mask image identifying a second one or more segments of the second object;

comparing, by the third neural network model, the second section of the source image and the second preliminary mask image; and refining, by the third neural network and based on the comparison between the second section of the source image and the second preliminary mask image, the second preliminary mask image to generate a second refined mask image.

6. The method of claim 1, wherein identifying the section of the source image comprises:

identifying the object in the source image; and forming a bounding box in the source image, the bounding box encompassing the object, the bounding box defining the section of the source image.

7. The method of claim 1, wherein refining the preliminary mask image to generate the refined mask image comprises:

performing a channel-wise concatenation of the section of the source image and the preliminary mask image; and generating the refined mask image, based at least in part on performing the channel-wise concatenation.

8. The method of claim 1, wherein the object is a human, and the one or more segments comprises one or more of (i) different human body parts including one or more of face, hair, arm, hand, and/or leg, (ii) one or more clothing articles worn by the human, including one or more of a shirt or top, a pant or legging, a vest, and/or a dress, skirt or kilt, and (iii) one or more accessories carried by the human, including one or more of a cell phone or computing device, a hand bag, a watch, a hat, eyeglasses, shoes, or a back-pack.

9. The method of claim 1, further comprising:

receiving a request to modify a design and/or color of a segment of the object; and modifying the source image, using the refined mask image, to generate a modified image, based on the request.

10. The method of claim 9, wherein generating the modified image comprises:

identifying, using the refined mask image, one or more pixels in the source image that are associated with the segment of the object to the modified; and modifying the one or more pixels in the source image, to generate the modified image.

11. The method of claim 1, wherein the object is a human, and wherein the method further comprises:

training the second neural network model using images within a training data set, the images within the training data set including images of humans and images that exclude humans; and implementing a transfer learning technique to further train the second neural network model to identify human segments within images.

12. A system to modify a segment of a human in a source image that includes at least the human, the system comprising:

one or more processors;

an image parsing pipeline executable by the one or more processors, the image parsing pipeline comprising an object detection module to detect the human in the source image, a segmentation module to generate a preliminary mask image that identifies a plurality of segments of the human in the source image, and a refinement module to refine the identification of the plurality of segments of the human in the preliminary mask image, and to generate a final mask image based on the refinement; and an image modification module executable by the one or more processors to modify a segment of the human in the source image, based on the final mask image identifying pixels of the segment to be modified.

13. The system of claim 12, wherein to detect the human in the source image, the object detection module is to:

form a bounding box in the source image, the bounding box encompassing the human in the source image.

14. The system of claim 13, wherein:

the human is a first human;

the bounding box encompasses the first human and at least a section of a second human; and in the final mask image, the refinement module is to label at least the section of the second human as background.

15. The system of claim 14, wherein:

in the preliminary mask image, the segmentation module is to erroneously identify at least the section of the second human as a segment of the first human.

16. The system of claim 12, wherein to refine the identification of the plurality of segments of the human in the preliminary mask image, the refinement module is to:

compare the source image and the preliminary mask image; and refine the identification of the plurality of segments of the human in the preliminary mask image and generate the final mask image, based on the comparison.

17. A computer program product including one or more non-transitory machine-readable mediums encoded with instructions that when executed by one or more processors cause a process to be carried out for identifying segments of an object in a source image, the process comprising:

detecting, by a first neural network model, the object within the source image;

generating, by a second neural network model, a preliminary mask image that identifies a plurality of segments of the object; and generating, by a third neural network model, a final mask image, by refining the identification of the plurality of segments of the object in the preliminary mask image.

18. The computer program product of claim 17, wherein the first neural network model, the second neural network model, and the third neural network model are three different and distinct neural network models.

19. The computer program product of claim 17, the process further comprising:

modifying a segment of the object in the source image, based on the final mask image identifying one or more pixels that are associated with the segment.

20. The computer program product of claim 17, wherein the object is a human, and the plurality of segments comprises one or more of (i) different human body parts including one or more of face, hair, hand, and/or leg, (ii) one or more dresses worn by the human, and (iii) one or more accessories carried by the human, including one or more of a cell phone, a hand bag, a shoe, eye glasses, or a back pack.

* * * * *